(12) United States Patent
Sodano et al.

(10) Patent No.: US 11,986,993 B2
(45) Date of Patent: May 21, 2024

(54) METHODS FOR FORMING THREE-DIMENSIONAL POLYMERIC ARTICLES

(71) Applicant: THE REGENTS OF THE UNIVERSITY OF MICHIGAN, Ann Arbor, MI (US)

(72) Inventors: Henry A. Sodano, Ann Arbor, MI (US); Ruowen Tu, Ann Arbor, MI (US); Ethan Cassidy Sprague, Dublin, CA (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 203 days.

(21) Appl. No.: 17/365,099

(22) Filed: Jul. 1, 2021

(65) Prior Publication Data
US 2022/0001597 A1    Jan. 6, 2022

Related U.S. Application Data

(60) Provisional application No. 63/125,915, filed on Dec. 15, 2020, provisional application No. 63/047,392, filed on Jul. 2, 2020.

(51) Int. Cl.
*B29C 64/106*     (2017.01)
*B29C 64/295*     (2017.01)
(Continued)

(52) U.S. Cl.
CPC .......... *B29C 64/106* (2017.08); *B29C 64/295* (2017.08); *B33Y 10/00* (2014.12);
(Continued)

(58) Field of Classification Search
None
See application file for complete search history.

(56) References Cited

U.S. PATENT DOCUMENTS

5,355,318 A * 10/1994 Heliodore ............ B33Y 50/00
                                                156/275.5
2019/0054659 A1 * 2/2019 Tseng ................. B29C 64/118

FOREIGN PATENT DOCUMENTS

CN      107901400 A      4/2018
KR      20160009891 A    1/2016
(Continued)

OTHER PUBLICATIONS

Abzan, Nadia. "Development of three-dimensional piezoelectric polyvinylidene fluouride-graphene oxide scaffold by non-solvent induced phase separation method for nerve tissue engineering." Apr. 5, 2019, Materials & Design, vol. 167, entire document (Year: 2019).*

(Continued)

*Primary Examiner* — Allison Bernstein
*Assistant Examiner* — Margaret B Hayes
(74) *Attorney, Agent, or Firm* — MARSHALL, GERSTEIN & BORUN LLP

(57) ABSTRACT

The disclosure relates to methods of forming three-dimensional (3D) polymeric articles and additive manufacturing apparatuses for the same. The methods include providing a polymeric solution comprising a polymer dissolved in a solvent; providing a non-solvent, wherein the solvent is miscible in the non-solvent, and the polymer is insoluble in the non-solvent; and injecting the polymeric solution into the non-solvent in a pre-determined 3D pattern to provide a 3D polymeric article.

29 Claims, 11 Drawing Sheets

(51) Int. Cl.
  *B33Y 10/00* (2015.01)
  *B33Y 30/00* (2015.01)
  *B33Y 40/20* (2020.01)
  *B29K 101/10* (2006.01)
  *B29K 105/16* (2006.01)
  *B29K 505/00* (2006.01)

(52) U.S. Cl.
  CPC .............. *B33Y 30/00* (2014.12); *B33Y 40/20* (2020.01); *B29K 2101/10* (2013.01); *B29K 2105/16* (2013.01); *B29K 2505/00* (2013.01)

(56) References Cited

FOREIGN PATENT DOCUMENTS

| | | | |
|---|---|---|---|
| KR | 20190034123 A | 4/2019 | |
| WO | WO-2018085936 A1 * | 5/2018 | ........... B29C 64/106 |
| WO | WO-2019/157307 A1 | 8/2019 | |
| WO | WO-2021/006820 A1 | 1/2021 | |

OTHER PUBLICATIONS

He, Zhongchen, "Electrospun PVDF Nanofibers for Piezoelectric Applications: A Review of the Influence of Electrospinning Parameters on the Beta Phase and Crystallinity Enhancement", Jan. 13, 2021, Polymers (Basel), vol. 174, entire document (Year: 2021).*
Karyappa et al., "Immersion precipitation 3D printing (ip3DP)," *Materials Horizons*, 6:1834-44 (2019).
Tu et al., "Precipitation printing towards diverse materials, mechanical tailoring and functional devices," *Addit. Manuf.*, 35:1-11 (2020).
Tu et al., "Precipitation-Printed High-β Phase Poly(vinylidene fluoride) for Energy Harvesting," *ACS Appl. Mater. Interfaces*, 12:58072-81 (2020).

* cited by examiner

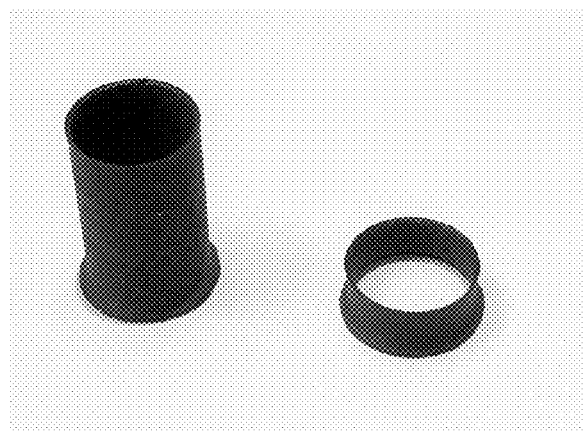
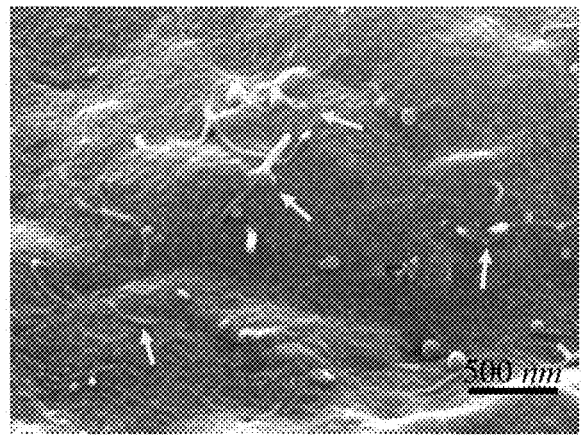
FIG. 5A
FIG. 5B
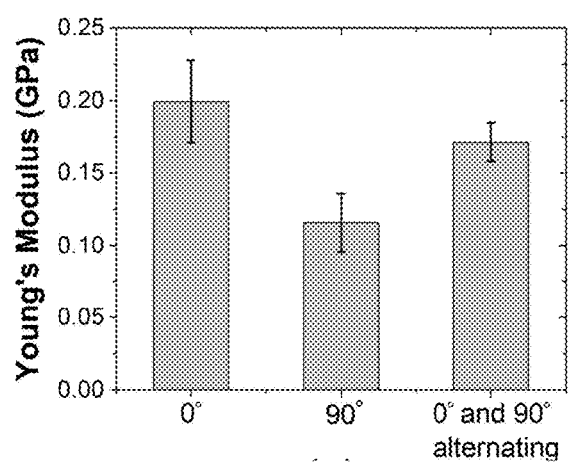
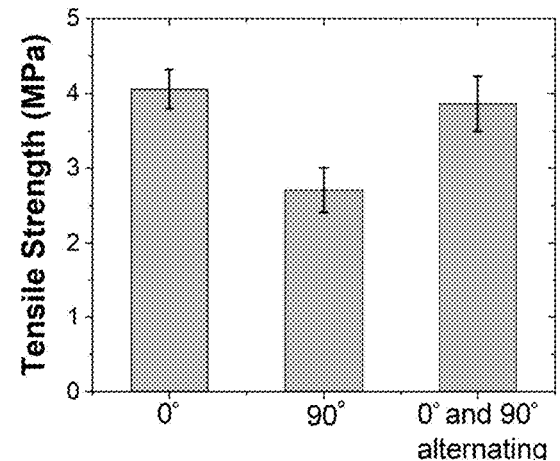
FIG. 6A
FIG. 6B
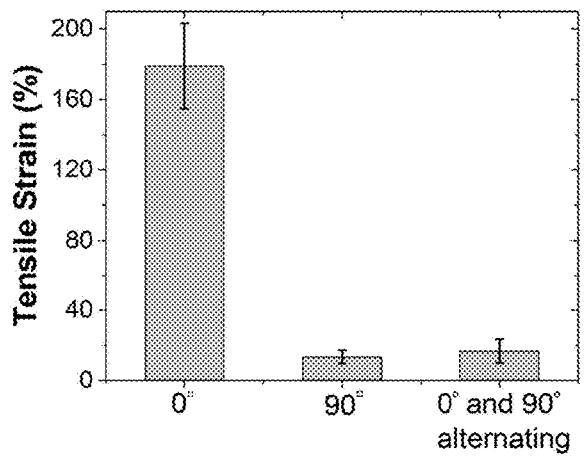
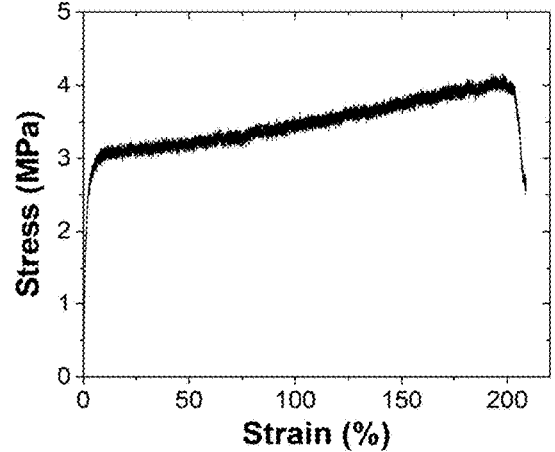
FIG. 6C
FIG. 6D

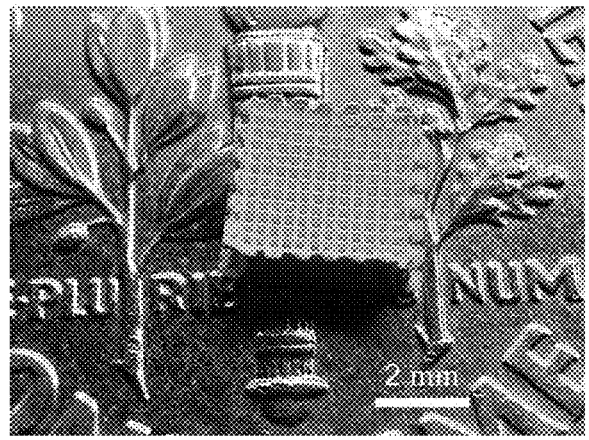
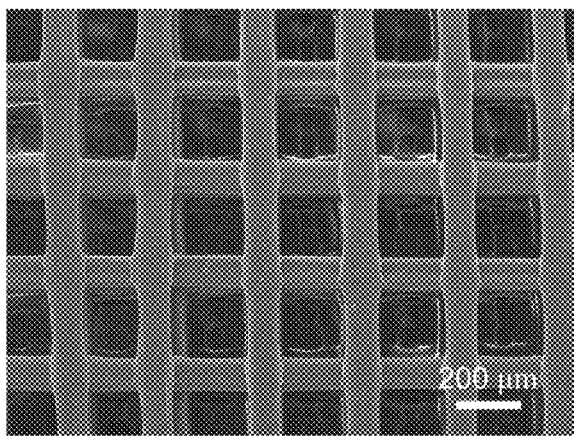
FIG. 9A  FIG. 9B
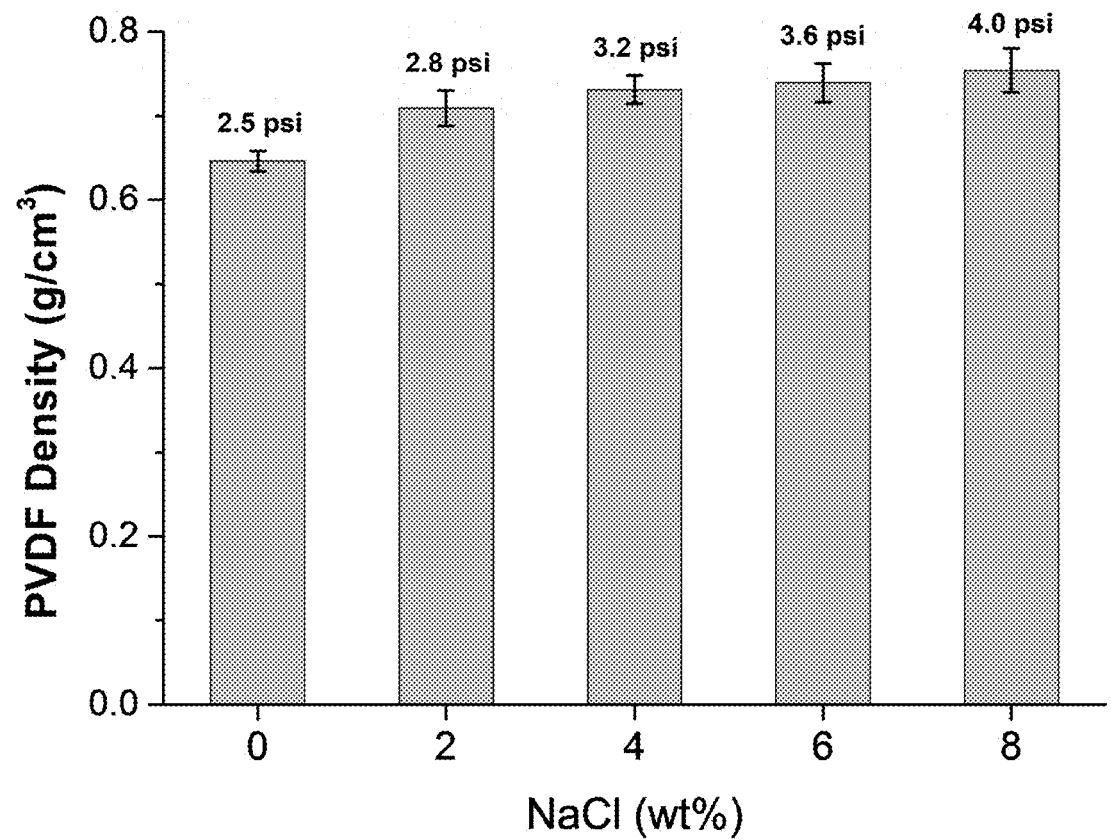
FIG. 10

METHODS FOR FORMING THREE-DIMENSIONAL POLYMERIC ARTICLES

CROSS-REFERENCE TO RELATED APPLICATION

Priority is claimed to U.S. Provisional Application No. 63/125,915 (filed Dec. 15, 2020) and U.S. Provisional Application No. 63/047,392 (filed Jul. 2, 2020), each of which is incorporated herein by reference in its entirety.

STATEMENT OF GOVERNMENT INTEREST

This invention was made with government support under FA9550-16-1-0087 awarded by the Air Force Office of Scientific Research and EFR11935216 awarded by the National Science Foundation. The government has certain rights in the invention.

BACKGROUND

Field of the Disclosure

The disclosure relates generally to methods of forming three-dimensional (3D) polymeric articles and additive manufacturing apparatuses for forming 3D polymeric articles.

Brief Description of Related Technology

Additive manufacturing (e.g., 3D printing) is a fabrication technique that is capable of manufacturing complex parts layer-by-layer without geometric restrictions encountered in conventional manufacturing techniques. With the development of computer-aided design (CAD) and computer-aided manufacturing (CAM), additive manufacturing provides nearly unlimited design freedom and manufacturing convenience for industry. Recent advances in additive manufacturing have changed it from merely prototyping models to directly manufacturing final products.

Polymers are one of the most widely used materials in industry and have garnered significant attention in the additive manufacturing field over the last 30 years. Common additive manufacturing methods for polymers include laser-based techniques (e.g., vat photopolymerization and powder bed fusion), extrusion-based techniques (e.g., material extrusion), as well as binder-based technique (e.g., binder jetting). Recent laboratory additive manufacturing methods include pneumatic controlled extrusion or dispensing of materials, such as direct ink writing. However, there are still limitations on the types of materials that can be fabricated through these well-developed methods. For example, vat photopolymerization requires a photocurable polymer resin which can be cost prohibitive, and direct ink writing requires a fluid gel or ink with suitable viscosity for printing.

Among all these polymer additive manufacturing methods, material extrusion is currently the most commonly used approach for polymers due to its short cycle time, high-dimensional accuracy, low cost and convenient integration with different CAD software. Despite its broad reach and ubiquity, the material selection for extrusion is limited by the melting process, and only neat thermoplastics or thermoplastic based composites can be manufactured. Therefore, for polymers with a high melting point (e.g., polyetheretherketone (PEEK)), or those that decompose below their melting point, as well as those with properties stable only below a certain temperature (e.g., piezoelectric β phase of PVDF), material extrusion is not an acceptable technique. Moreover, material extrusion can be subject to deformation through warping of the part which results due to thermal stress, and can lead to the detachment of the printed structure from the bed platform during printing even if the bed is heated.

Most piezoelectric materials are formed from thin films or membranes. Recent developments in additive manufacturing (or 3D printing) has allowed the fabrication of sensors, actuators, and devices with geometric complexity and structure scalability. An example of this is fused deposition modeling (FDM), a method that has been used to successfully create piezoelectric PVDF devices by applying a high voltage between the hot end of an extruder and the printing substrate, thus creating an electric field across the deposited material and promoting the formation of β phase. This method requires printing at temperatures higher than the melting point of PVDF (around 178° C.), which may lead to the reduction of β phase due to its susceptibility to transform into α phase near the polymer's melting point. Solution-based 3D printing with in situ high electric field poling is another method that produces high piezoelectric PVDF consisting of up to 71% β phase, while no melting of the PVDF is required. However, this method is restricted to the fabrication of thin PVDF films, as the distance between the dispensing nozzle and the grounded substrate is required to remain constant and small (less than 2 mm) to maintain the high electric field. Inkjet printing of PVDF-trifluoroethylene (TrFE) copolymer was used to 3D print high performance piezoelectric devices. The higher crystallinity of β phase in these copolymers is attributed to the addition of TrFE, which introduces more steric effects to the crystalline region of PVDF, resulting in up to 92.8% β phase. However, PVDF-TrFE copolymer is significantly more expensive to produce than pure PVDF, which limits its wide application at an industrial scale.

Additive manufacturing also allows for the fabrication of polymer nanocomposites through the dispersion of fillers to produce multifunctional devices. Specifically, researchers have developed various PVDF nanocomposites through additive manufacturing techniques, either through the incorporation of non-piezoelectric fillers that promote the formation of β phase or using piezoelectric fillers that further enhance the overall piezoelectric properties. For example, digital light projection has been used to create 3D piezoelectric parts by suspending PVDF in a UV light photocurable resin. However, the described process significantly limits the piezoelectric concentration in order to ensure a sufficient amount of photocurable resin, with 35 wt % of PVDF filler in the photocurable resin. Multi-walled carbon nanotubes and graphene have been incorporated into PVDF for a 17.12% increase in β phase content when using a solution dispensing technique with in situ electric poling. Other solution-based methods used to produce composite PVDF multifunctional devices include a one-step solvent evaporation method, where a mixture of high viscosity PVDF and barium titanate ($BaTiO_3$) nanowires was prepared in the form of a liquid solution and then dispensed. Upon evaporation of the solvent, the remaining structure exhibited clear piezoelectric properties without requiring an electric poling process, which is attributed to the dipoles in the polymer being aligned during the directionality of the high pressure and speed printing process.

Microscale piezoelectric devices in the form of polyurethane (PU)/PVDF scaffolds have been formed via electrospinning. While electrospinning enables a simultaneous electric poling process during the build of the piezoelectric 3D structures, it remains a limited process that is primarily used to produce thin fibers or scaffolds.

Energy harvesting is one of the major application fields for piezoelectric devices, as piezoelectric energy harvesters can transform waste mechanical energy into electricity. For example, shoe insole energy harvesters exploit the bending or compression of thin piezoelectric films to capture the waste mechanical energy during daily walking. One device harvests energy through the transverse piezoelectric effect ($d_{31}$ mode) by building PVDF bimorphs and lead zirconate titanate (PZT) dimorphs in bending, respectively, as the resulting shoe energy harvester displayed powers of 1.3 mW using PVDF and 8.4 mW using PZT. Another device harvests energy through stretching mode of the transverse piezoelectric effect by stacking multiple layers of commercial PVDF films capable of generating power output of 1 mW. Another energy harvester device consisted of a piezoelectric cantilever beam, a ferromagnetic ball and a crossbeam to collect energy from various excitation sources. The multi-source energy harvester was found to generate up to 0.35 mW power when walking at a speed of 8 km h$^{-1}$. A curved PVDF generator has been formed which could reach 120 V peak output voltage and 700 µA peak output current. Most developed shoe energy harvesters are based on the transverse piezoelectric effect ($d_{31}$ mode) instead of longitudinal piezoelectric effect ($d_{33}$ mode), since typical piezoelectric devices are mostly thin films where it is impractical to apply a large strain along the thickness direction.

SUMMARY

In one aspect, the disclosure relates to methods of forming a three-dimensional (3D) polymeric article, the methods comprising providing a polymeric solution comprising a polymer dissolved in a solvent; providing a non-solvent (e.g., reservoir containing the non-solvent), wherein the solvent is miscible in the non-solvent, and the polymer is insoluble in the non-solvent; and injecting the polymeric solution into the non-solvent at a temperature of 15° C. or less or at least 30° C. in a pre-determined 3D pattern (e.g., varying in all three dimensions with an additive structure), thereby precipitating the polymer from the polymeric solution in the non-solvent as a solid polymeric material to provide the 3D polymeric article.

In another aspect, the disclosure relates to methods of forming a three-dimensional (3D) polymeric article, the methods comprising: providing a polymeric solution comprising a polymer dissolved in a solvent; providing a non-solvent and a salt dissolved in the non-solvent, wherein the solvent is miscible in the non-solvent, and the polymer is insoluble in the non-solvent; and injecting the polymeric solution into the non-solvent in a pre-determined 3D pattern (e.g., varying in all three dimensions with an additive structure), thereby precipitating the polymer from the polymeric solution in the non-solvent as a solid polymeric material to provide the 3D polymeric article.

In another aspect, the disclosure relates to methods of forming a three-dimensional (3D) polymeric article, the methods comprising: providing a polymeric solution comprising a thermosetting resin (e.g., crosslinkable but non-crosslinked polymer, oligomer, or monomer) dissolved in a solvent and a crosslinking catalyst or initiator dissolved in the solvent; providing a non-solvent, wherein the solvent is miscible in the non-solvent, and the thermosetting resin (and eventual crosslinked thermoset polymer) is insoluble in the non-solvent; injecting the polymeric solution into the non-solvent in a pre-determined 3D pattern (e.g., varying in all three dimensions with an additive structure), thereby precipitating the thermosetting resin from the polymeric solution in the non-solvent as a solid polymeric material to provide a curable 3D resin article; and crosslinking (e.g., by application of heat) the curable 3D resin article, thereby curing the thermosetting resin and forming the 3D polymeric article.

In another aspect, the disclosure relates to methods of forming a composite three-dimensional (3D) polymeric article, the methods comprising: providing a polymeric solution comprising a polymer dissolved in a solvent and a reinforcement or filler (e.g., functional filler) dispersed in the solvent (e.g., a solid material dispersed/suspended in the liquid solvent medium, but not dissolved therein); providing a non-solvent, wherein the solvent is miscible in the non-solvent, and the polymer is insoluble in the non-solvent; injecting the polymeric solution into the non-solvent in a pre-determined 3D pattern (e.g., varying in all three dimensions with an additive structure), thereby precipitating the polymer from the polymeric solution in the non-solvent as a solid polymeric matrix (e.g., continuous matrix) material with the reinforcement or filler distributed throughout the matrix to provide the composite 3D polymeric article.

In another aspect, the disclosure relates to methods of forming a three-dimensional (3D) polymeric article, the methods comprising: providing a polymeric solution comprising a polymer dissolved in a solvent; providing a non-solvent, wherein the solvent is miscible in the non-solvent, and the polymer is insoluble in the non-solvent; and injecting the polymeric solution into the non-solvent in a pre-determined 3D pattern (e.g., varying in all three dimensions with an additive structure) at two or more different printing infill orientations (or angles) relative to a reference plane such as defined by a printing substrate in the non-solvent (e.g., alternating angles between layers), thereby precipitating the polymer from the polymeric solution in the non-solvent as a solid polymeric material to provide the 3D polymeric article.

In another aspect, the disclosure relates to methods of forming a three-dimensional (3D) polymeric article, the methods comprising: providing a polymeric solution comprising a polymer dissolved in a solvent; providing a non-solvent (e.g., reservoir containing the non-solvent), wherein the solvent is miscible in the non-solvent, and the polymer is insoluble in the non-solvent; and injecting the polymeric solution into the non-solvent in a pre-determined 3D pattern using an additive manufacturing apparatus, thereby precipitating the polymer from the polymeric solution in the non-solvent as a solid polymeric material to provide the 3D article, wherein the additive manufacturing apparatus comprises: a reservoir comprising the non-solvent; a printing substrate immersed in the non-solvent (e.g., within the reservoir); an injection head (e.g., syringe with a dispensing needle or other print head structure) adapted to deliver the polymeric solution into the non-solvent in the reservoir (e.g., polymeric solution loaded in the syringe and/or in another reservoir in fluid communication with the injection head); and, a temperature control means. The temperature control means can be adapted to control or adjust the temperature of at least one of the non-solvent in the reservoir and the polymeric solution, for example as loaded in a syringe or other polymeric solution reservoir, as being dispensed from the injection head, etc.

Various refinements of the disclosed methods are possible.

In refinements, the polymer is selected from the group consisting of poly(vinylidene fluoride) (PVDF), polylactic acid (PLA), polystyrene (PS), poly(methyl methacrylate) (PMMA), acrylonitrile butadiene rubber (NBR), and any combination thereof. More generally, the polymer can be a thermoplastic or thermosetting polymer. In some embodiments, the polymeric solution in the various aspects can include thermosetting resin, which may or may not have polymeric components as originally provided in the polymeric solution and as dispensed into the non-solvent, but which can be polymerized and crosslinked into a thermoset polymer after precipitation in the non-solvent in its desired 3D shape.

In refinements, the polymeric solution further comprises a reinforcement or filler (e.g., functional filler), such as a multi-walled carbon nanotube (MWCNT), a single-walled carbon nanotube (SWCNT), a metal powder, an aramid nanofiber, or a combination thereof. In refinements, the metal powder comprises gold, silver, copper, or a combination thereof. In refinements, the polymeric solution comprises a MWCNT present in an amount of 0.005 wt. % to about 8 wt. %, based on the total weight of the polymeric solution.

In refinements, the solvent comprises N,N-dimethylformamide (DMF), acetone, dichloromethane (DCM), toluene, dimethylsulfoxide (DMSO), N,N-dimethylacetamide (DMAc), methyl ethyl ketone (MEK), benzene, styrene, xylene, N-methyl-2-pyrrolidone (NMP), propylene carbonate, tetrahydrofuran (THF), or a combination thereof.

In refinements, the polymer is present in a concentration of at least about 10 wt. %, based on the total weight of the polymeric solution.

In refinements, the polymeric solution further comprises an additive. In refinements, the additive comprises an emulsifier, a surfactant, a dispersant, a colorant, or any combination thereof. In refinements, the polymeric solution comprises polyvinylpyrrolidone in an amount of about 0.5 wt. % to about 2 wt. %, based on the total weight of the polymeric solution.

In refinements, the non-solvent comprises water, ethanol, benzene, silicone oil, or a combination thereof.

In refinements, the methods comprise performing the method using an additive manufacturing apparatus comprising: a reservoir comprising the non-solvent; a printing substrate immersed in the non-solvent (e.g., within the reservoir); an injection head (e.g., syringe with a dispensing needle or other print head structure) adapted to deliver the polymeric solution into the non-solvent in the reservoir (e.g., polymeric solution loaded in the syringe and/or in another reservoir in fluid communication with the injection head); and, optionally, a temperature control means. The temperature control means can be adapted to control or adjust the temperature of at least one of the non-solvent in the reservoir and the polymeric solution, for example as loaded in a syringe or other polymeric solution reservoir, as being dispensed from the injection head, etc. In refinements, the printing substrate is a glass plate. In refinements, the printing substrate comprises a film coating, the film coating comprising the polymer of the polymeric solution. In refinements, the injection head comprises a dispensing needle having a diameter of about 24-gauge (305 μm) to about 30-gauge (150 μm).

In refinements, injecting the polymeric solution into the non-solvent comprises: contacting the injection head and the printing substrate to apply a first layer of the polymer to the printing substrate; and, applying a plurality of layers of the polymer, each layer being applied to a previous layer, until the 3D polymeric article is formed. In refinements, each layer of the plurality of layers is applied at a continuous printing speed of about 5 mm/s to about 12 mm/s. In refinements, each layer of the plurality of layers has a thickness of about 0.03 mm to about 1 mm. In refinements, each layer of the plurality of layers is applied at a pressure of about 1.0 psi (6.9 kPa) to about 30.0 psi (207 kPa).

In refinements, the non-solvent has a temperature of about 20° C. to about 80° C.

In refinements, the non-solvent comprises up to about 8 wt. % of a salt, based on the total weight of the non-solvent. In refinements, the salt comprises sodium chloride.

In refinements, the methods further comprise curing the 3D polymeric article. In refinements, the curing temperature is about 100° C. to about 200° C.

In refinements, the methods are free of solvent evaporation and/or non-solvent evaporation.

In refinements, the directly printed polymeric material (e.g., forming the 3D polymeric article) has a density that is at least 20% of the density of a fully dense material formed from the polymer (e.g., same polymer or polymers such as in a blend etc.).

In refinements, the 3D polymeric article is in the form of a piezoelectric flexible conductor nanocomposite; the polymer comprises poly(vinylidene fluoride) (PVDF) as the polymer and a solid polymeric matrix; and the polymeric solution comprises a reinforcement initially dispersed in the solvent and distributed throughout the solid polymeric matrix in the nanocomposite.

In refinements, the 3D polymeric article is in the form of a piezoelectric material; and the polymer comprises poly(vinylidene fluoride) (PVDF).

In some refinements using PVDF as a polymer (e.g., in a piezoelectric structure), the PVDF can be characterized as having a relatively high beta ($\beta$) crystalline phase content and/or a relatively high combined beta ($\beta$)+gamma ($\gamma$) crystalline phase content (e.g., expressed on a weight, molar, or number basis relative to the PVDF as a whole). For example, the beta ($\beta$) phase content can be at least 40, 50, 60, 70, or 80% and/or up to 60, 70, 80, 90, or 95%. Alternatively or additionally, the combined beta ($\beta$) and gamma ($\gamma$) phase content can be at least 70, 80, 85, 90, or 95% and/or up to 80, 90, 95, 98, 99, or 100%. Alternatively or additionally, the gamma ($\gamma$) phase content can be at least 5, 10, 15, 20, or 25% and/or up to 15, 20, 25, 30, or 40%. In some aspects, the disclosure relates to a PDVF material having the foregoing crystalline phase distribution, or a corresponding piezoelectric 3D polymeric article formed from or otherwise including the PDVF material.

In some refinements using PVDF as a polymer (e.g., in a piezoelectric structure), the 3D polymeric article is also in the form of a piezoelectric energy harvester, for example with attendant electrodes and/or other electrical connections to transmit electrical energy transformed from mechanical energy by the energy harvester. For example, the piezoelectric energy harvester can be in the form of a shoe insole. In some aspects, the disclosure relates to a piezoelectric energy harvester formed from or otherwise including the PDVF material or corresponding piezoelectric 3D polymeric article.

In some refinements using PVDF as a polymer (e.g., in a piezoelectric structure), the method further comprises performing at least one of annealing, hot-pressing, and poling to the 3D polymeric article after precipitation. The annealing, hot-pressing, and poling are suitably performed at elevated temperatures, for example at least 50, 60, 70, 80, or 100° C. and/or up to 80, 90, 100, 120, or 150° C., being independently selected for each process. Annealing and poling can transform gamma (γ) phase into beta (β) phase in the PVDF. Hot pressing is suitably performed at a sufficient pressure (e.g., 10-50 MPa) to compress and reduce the internal porosity of the printed PVDF material (e.g., up to 5, 10, or 15% and/or at least 1, 2, or 5% internal porosity). Poling (e.g., direct field poling) is suitably performed with the printed PVDF in a heated oil bath and with application of a strong electric field.

In another aspect, the disclosure provides printing apparatus for forming a three-dimensional (3D) polymeric article, the apparatus comprising: a reservoir adapted to receive a non-solvent therein; optionally, a printing substrate in the reservoir; an injection head adapted to deliver a polymeric solution into the non-solvent in the reservoir; and a temperature control means adapted to control or adjust the temperature of at least one of the non-solvent in the reservoir and polymeric solution delivered by the injection head. In some embodiments, the reservoir can contain the non-solvent therein and/or be in fluid communication with a source of non-solvent (e.g., an inlet feed line of non-solvent). In some embodiments, the printing substrate can be mounted or otherwise placed in the reservoir volume to receive printed/precipitated material. In some embodiments, the injection head can be a syringe with a dispensing needle or other print head structure. In some embodiments, the apparatus can include an additional (second) reservoir in fluid communication with the injection head, which additional reservoir can include polymeric solution loaded therein. The additional reservoir can be an internal syringe volume, external supply or feed line for polymeric solution components, etc.

While the disclosed articles, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 5A is an image of multiwalled carbon nanotube-PVDF (MWCNT-PVDF) nanocomposite prepared according to the methods of the disclosure.

FIG. 5B is an SEM image of a MWCNT-PVDF nanocomposite comprising 6 wt. % MWCNT prepared according to the methods of the disclosure.

FIG. 6A is a graph of the Young's modulus of a 3D polymeric article comprising PVDF prepared according to the methods of the disclosure.

FIG. 6B is a graph of the tensile strength of a 3D polymeric article comprising PVDF prepared according to the methods of the disclosure.

FIG. 6C is a graph of the tensile strain of a 3D polymeric article comprising PVDF prepared according to the methods of the disclosure.

FIG. 6D is a graph of the stress-strain curve for load axis parallel to the infill direction of a 3D polymeric article comprising PVDF prepared according to the methods of the disclosure.

FIG. 9A is an image of a micro-scaffold structure prepared with PVDF according to the methods of the disclosure on a dime coin.

FIG. 9B is an SEM image of a micro-scaffold structure prepared with PVDF according to the methods of the disclosure.

FIG. 10 is a graph of the effect of non-solvent salinity on the density of a 3D polymeric article comprising PVDF prepared according to the methods of the disclosure.

DETAILED DESCRIPTION

Figure 1:
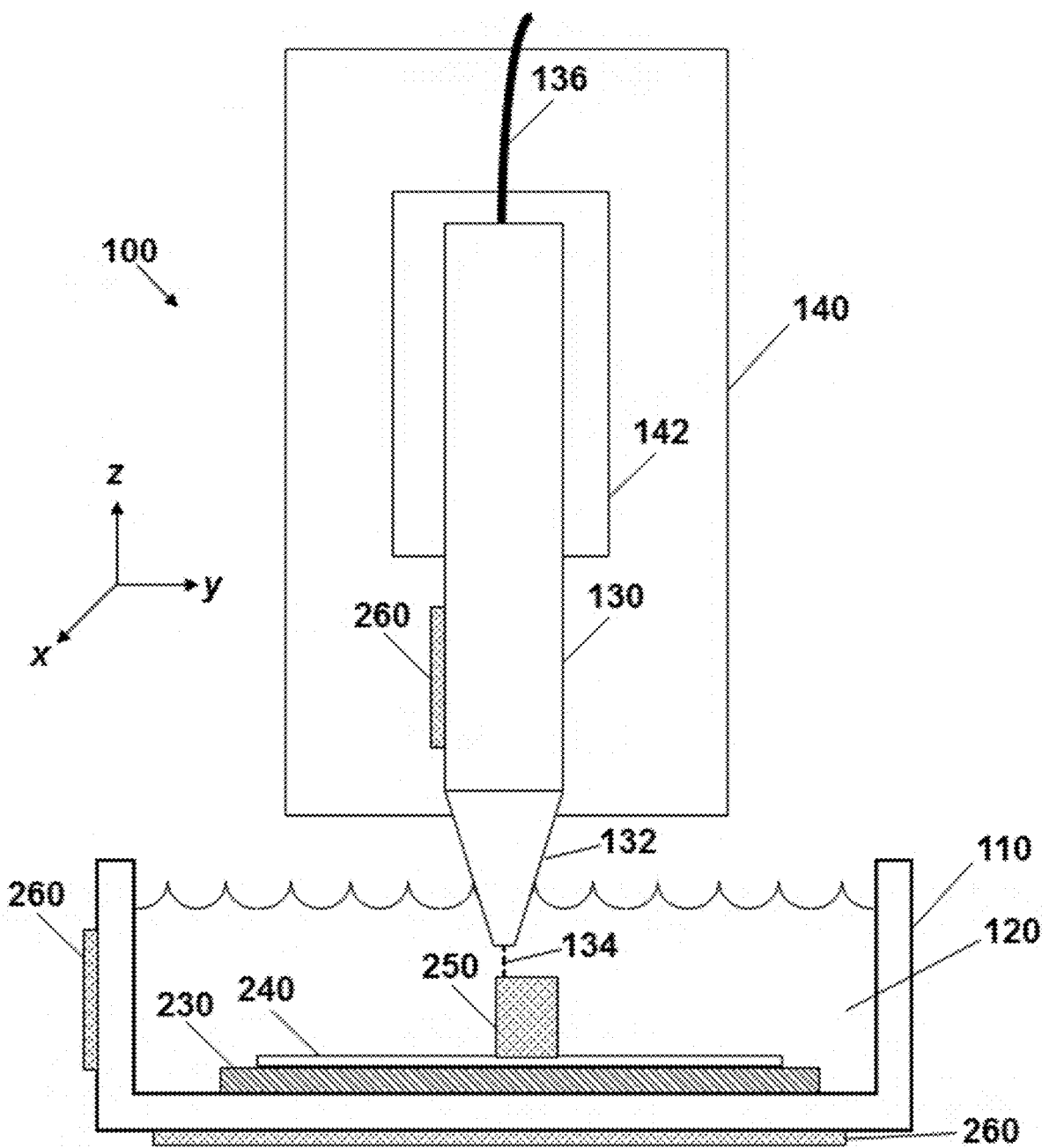
FIG. 1 is a schematic of a printing apparatus according to the disclosure.

To overcome the limitations of material extrusion, solution-based additive manufacturing methods have been developed, which can used for any polymer, based on the solubility of the polymer in certain solvents. With solution-based methods, the range of polymers available for additive manufacturing can be greatly expanded. Solvent-cast 3D printing or direct ink writing is one of the most commonly used solution-based methods. With this method, a polymer solution is extruded out of a nozzle under precise pneumatic control, and the polymers then solidify through the rapid evaporation rate of the solvent on a hot bed substrate. This printing method can only be used to print small scale functional material structures, however, since the solvent evaporation rate decreases as the nozzle moves away from the heated substrate, and it becomes difficult to print large structures.

Wet spinning, another solution-based additive manufacturing method in the biomedical engineering field has been applied to fabricate scaffolds for cell growth and injects a polymer solution directly into a coagulation bath with a poor solvent to solidify polymer fibers. This technique is suitable for printing fine scaffolds with wet spun fibers, but only biomaterials have been demonstrated. In addition, the requirement that the printed parts forming within fibers or scaffolds results in limitations for this printing method.

The materials prepared according to the methods of the disclosure can be self-supporting and capable of complex geometries with high accuracy. The scale of the prints is generally comparable to those structures made by material extrusion method, but can also achieve a high printing resolution for microstructures. Compared with material extrusion or solvent-cast 3D printing, the methods of the disclosure do not require material melting or solvent evaporation, which allows for room temperature printing and removes the safety risks associated with the volatilization of the solvent. Moreover, the methods of the disclosure require less equipment and have lower costs.

Methods of Forming 3D Polymeric Articles

Provided herein are methods of forming 3D polymeric articles. In general, the methods of the disclosure include providing a polymeric solution with a polymer dissolved in a solvent; providing a non-solvent, wherein the solvent is miscible in the non-solvent, and the polymer is insoluble in the non-solvent; and injecting the polymeric solution into the non-solvent in a pre-determined 3D pattern. After injection of the polymeric solution, the polymer (or polymer precursor(s) such as in a thermosetting resin) precipitates from the polymeric solution into the non-solvent, thereby forming the 3D polymeric article. Advantageously, the methods can be tailored to provide various types of 3D polymeric articles, such as nanocomposites or micro-scaffolds, with various tunable properties such as polymeric composition, density, mechanical properties, and the like.

Polymeric Solution

The methods of the disclosure include providing a polymeric solution in liquid form. The polymeric solution can include a polymer dissolved in a suitable solvent. In embodiments, the polymeric solution includes monomers and a polymerization initiator dissolved in a suitable solvent, such that the polymer forms in situ. The polymer (or monomers thereof) can include thermoset and/or thermoplastic polymers. Examples of suitable polymers include, for example, poly(vinylidene fluoride) (PVDF), polylactic acid (PLA), polystyrene (PS), poly(methyl methacrylate) (PMMA), acrylonitrile butadiene rubber (NBR), any monomer(s) thereof, or any combination thereof. In embodiments, the polymeric solution includes PVDF, or monomers thereof. In embodiments, the polymeric solution includes PMMA, or monomers thereof. In embodiments, the polymeric solution includes PLA, or monomers thereof. In embodiments, the polymeric solution includes PS, or monomers thereof. In embodiments, the polymeric solution includes NBR, or monomers thereof. More generally, examples of suitable thermoplastic polymers include acrylic polymers such as poly(methyl methacrylate) (PMMA), acrylonitrile butadiene styrene (ABS), fluoropolymers such as polytetrafluoroethylene (PTFE), poly(vinylidene fluoride) (PVDF), or other (per)fluorinated polyolefins, polyamide (nylon), polybenzimidazole, polycarbonate, polyether sulfone, polylactic acid (PLA), polyolefins such as polyethylene (e.g., LDPE, HDPE, etc.) or polypropylene, polyoxymethylene, polyetherimide, polyamide imide, polyamic acid, polyetherether ketone, polyetherimide, polyphenylene oxide, polysulfone, polyethersulfone, polyphenylene sulfide, polystyrene (PS), and polyvinyl chloride (PVC). More generally, examples of suitable thermoset polymers include polymers derived from thermosetting resins such as polyester resins, vinyl ester resins, polyurethane resins, polyurea resins, rubbers such as acrylonitrile butadiene rubber (NBR), phenol-formaldehyde resins, urea-formaldehyde resins, melamine resins, epoxy resins, and silicone resins. For thermosetting resins, the resin components, such as monomers, oligomers, prepolymers, non-crosslinked polymers, etc., are solid at the printing temperature so that they form an initially solid 3D resin structure upon precipitation, which results in a corresponding solid 3D thermoset structure upon curing/crosslinking. In addition to the foregoing examples of particular polymers or resins for printing according to the disclosure, the printed polymeric material can more generally include any suitable thermoplastic or thermosetting polymers or resins known in the art.

The polymeric solution can include a crosslinking catalyst or initiator, which, upon curing, can crosslinking of the polymer (or monomers thereof) in the 3D polymeric article through catalytic reactions such as radical polymerization or curing agents such as epoxy amine systems. Curing can be effected by any suitable means, for example by one or more of heating, UV irradiation, etc. Suitable curing agents are generally known by those skilled in the art for a particular polymer (e.g., a thermosetting polymer), and can include, for example a peroxide compound such as tert-butyl peroxybenzoate, azobisisobutyronitrile (AIBN), or methyl ethyl ketone peroxide (MEKP).

The polymeric solution can further include a reinforcement or filler (e.g., functional filler) dispersed in the solvent. Upon injection of the polymeric solution into the non-solvent, the polymer from the polymeric solution can be precipitated as a solid polymeric matrix, such as a continuous matrix, in which the reinforcement can be distributed throughout the matrix to provide a composite 3D polymeric article. The reinforcement can be provided in the polymeric solution to provide a pumpable/injectable mixture with the reinforcement and polymer present in any desired amounts to provide a corresponding loading level of the reinforcement in the resulting composite. For example, the reinforcement can be present in an amount from 0.005 to 40 wt. % or 0.1 to 40 wt. % in composite (e.g., including the matrix and reinforcement combined), such as at least 0.005, 0.01, 0.05, 0.1, 0.2, 0.5, 1, 2, 5, or 10 wt. % and/or up to 1, 2, 4, 6, 8, 10, 12, 15, 20, 25, 30, or 40 wt. %.

For example, the polymeric solution can include a solid material dispersed and/or suspended in the liquid solvent medium, but not dissolved therein. Examples of suitable reinforcements include multi-walled carbon nanotubes (MWCNTs), single-walled carbon nanotubes (SWCNTs), graphite, graphene, graphene nanoplatelets, graphene oxide powder, metal powder, fibers (e.g., carbon, glass, nylon, or other polymers), aramid nanofibers, nanowires, or combinations thereof. For example, for high electrical conductivity, a fine metal powder, such as a silver powder, a gold powder, or a copper powder, can be dispersed in the polymeric solution. Similarly, for high mechanical properties, carbon nanotubes (e.g., SWCNTs and/or MWCNTs) and aramid nanofibers can be used to increase the strength of the 3D polymeric article. For piezoelectric properties, a lead titanate (PTO) or barium titanate (BTO) nanowire can be dispersed in the polymeric solution. In embodiments, the polymeric solution includes an aramid nanofiber. In embodiments, the polymeric solution includes a metal powder, wherein the metal powder includes gold, silver, copper, or a combination thereof. In embodiments, the polymeric solution includes a nanowire.

In embodiments, the polymeric solution includes a MWCNT, a SWCNT, or a mixture thereof. The MWCNT and/or the SWCNT can be present in an amount of about 0.005 wt. % to about 8 wt. %, based on the total weight of the polymeric solution, for example at least about 0.005, 0.01, 0.05, 0.1, 0.2, 0.3, 0.4, 0.5, 0.7, 0.9, 1, or 2 wt. % and/or up to about 0.1, 0.5, 0.9, 1, 2, 3, 4, 5, 6, 7, or 8 wt. %, based on the total weight of the polymeric solution. The amount of MWCNT and/or SWCNT in the final 3D polymeric article can be determined by dividing the total amount of the MWCNT and/or SWCNT in the polymeric solution by the total amount of solids of the polymeric solution (i.e., the wt. % of the polymeric solution minus the wt. % of the solvent). For example, a polymeric solution comprising 14.1 wt. % polymer, 0.9 wt. % MWCNT, and 85 wt. % solvent will be expected to provide a 3D polymeric article comprising 6 wt. % MWCNT (i.e., 0.9 wt. %/15 wt. %×100 wt. %). As the concentration of the MWCNT and/or SWCNT increases, the viscosity of the polymeric solution similarly increases. Therefore, the size of the injection head (or other means of injection into the non-solvent) can be suitably adjusted (e.g., increased) to compensate for the increased viscosity of the polymeric solution.

The polymer (or monomers thereof) is dissolved in a solvent to provide the polymeric solution. Any suitable solvent that can dissolve the polymer of interest can be used, and the solvent is not otherwise particularly limited. In embodiments, the solvent includes N,N-dimethylformamide (DMF), acetone, dichloromethane (DCM), toluene, dimethylsulfoxide (DMSO), N,N-dimethylacetamide (DMAc), methyl ethyl ketone (MEK), benzene, styrene, xylene, N-methyl-2-pyrrolidone (NMP), propylene carbonate, tetrahydrofuran (THF), or a combination thereof. For example, when the polymer includes PVDF (with or without MWCNTs) or NBR, the solvent can include DMF. When the polymer includes PMMA, the solvent can include acetone.

The polymer can be present in the polymeric solution in an amount of at least about 10 wt. %, based on the total weight of the polymeric solution. Generally, when the polymer is present in amounts of less than about 10 wt. %, the resulting 3D polymeric article is too porous and therefore lacks mechanical strength. The polymer can be included up to any amount that remains soluble in the solvent and still has a suitable viscosity for printing, such as, at least about 10, 12, 15, 20, 25, 30, 40 or 45 wt. %, based on the total weight of the polymeric solution. For example, a polymeric solution comprising about 45 wt. % polystyrene polymer dissolved in toluene would be suitable for use in the methods described herein. As would be understood by those skilled in the art, each particular polymer/solvent pair would be expected to have a different upper limit of concentrations. In embodiments, the polymer is present in the polymeric solution in an amount of at least about 10, 15, 20, 25, 30, or 35 wt. %, and/or up to about 20, 25, 30, 35, 40, 45, or 50 wt. %, for example about 10 wt. % to about 25 wt. %, based on the total weight of the polymeric solution.

In embodiments, the polymeric solution further includes an additive. For example, the polymeric solution can include an emulsifier, a surfactant, a dispersant, a colorant, or a combination thereof. The additive can be present in an amount of about 0.5 wt. % to about 2 wt. %, for example at least about 0.5, 0.75, 1.0, 1.25, or 1.5 wt. % and/or up to about 1.0, 1.25, 1.5, 1.75, or 2.0 wt. %, based on the total weight of the polymeric solution. In embodiments, the polymeric solution includes polyvinylpyrrolidone (PVP) in an amount of about 0.5 wt. % to about 2 wt. %, based on the total weight of the polymeric solution. The additive can be included to aid in the methods (e.g., to increase or assist in the diffusion of the solvent into the non-solvent), or can be included to impart final characteristics to the 3D polymeric article. For example, when present, a colorant should be suitably soluble in the solvent and insoluble in the non-solvent, such that the color can be imparted to the final article.

Non-Solvent

The methods of the disclosure include providing a non-solvent in liquid form, for example, in a reservoir, wherein the solvent is miscible in the non-solvent, and the polymer is insoluble in the non-solvent. The methods of the disclosure are based on the different solubility of the polymer in two mutually miscible solvents. Because the solvent is miscible in the non-solvent while the polymer is not, as the solution leaves the injection head (e.g., dispensing needle), the solvent begins to diffuse away from the polymer, and the polymer precipitates and solidifies in the non-solvent reservoir. If the needle dispenses the solution close to the previous layers, the solution appears to dissolve the printed polymer, resulting in bonding between each layer. What is left is a porous solid that can be printed layer-by-layer in a pre-determined 3D pattern by suitable time-dependent movement and positioning of the injection head. Therefore, the non-solvent should be chosen according to the polymer and solvent present in the polymeric solution. Any liquid that does not dissolve the polymer and is miscible with the solvent can be selected as the non-solvent. To the extent that minor amounts of the polymer might dissolve in the non-solvent, suitably such amounts are less than about 0.1 g/100 ml or 0.1 wt. %, for example less than about 0.01 g/100 ml or 0.01 wt. %. Examples of suitable non-solvents include water, methanol, ethanol, propanol, benzene, and silicone oil. In embodiments, the non-solvent includes water. In embodiments, the non-solvent includes ethanol.

In embodiments, the temperature of the non-solvent can be controlled to increase or decrease the diffusion of the solvent into the non-solvent. For example, when the temperature of the non-solvent is greater than that of the solvent (of the polymeric solution), the solvent can diffuse more rapidly into the non-solvent. Conversely, when the temperature of the non-solvent is lower than that of the solvent (of the polymeric solution), the solvent can diffuse more slowly into the non-solvent. More generally, there can be a tradeoff or balance between the diffusion rate and solubility. Usually the polymer has an increasing solubility as the temperature rises, but the diffusion rate also increases. A high diffusion rate can remove the solvent faster to reduce porosity, but higher solubility has an opposite effect. Therefore, sometimes by decreasing the temperature, the porosity can also be tuned to be higher. The temperature of the non-solvent can therefore be tuned or otherwise selected to affect or control the porosity and mechanical properties of the resulting 3D polymeric article. The temperature of the non-solvent should be greater than its freezing point and less than its boiling point, such that the non-solvent remains in a liquid state during the injection. For example, when the non-solvent is water, it should have a temperature greater than 0° C.; when the non-solvent is ethanol, it should have a temperature greater than −114° C.; when the non-solvent is benzene, it should have a temperature of greater than 5.5° C.; etc. Similarly, the temperature of the non-solvent should be sufficiently high to maintain a liquid mixture with the solvent, such that the solvent itself does not crystallize or otherwise precipitate. In some embodiments, the method can be performed at an elevated pressure (e.g., in a pressurized non-solvent reservoir) to elevate the boiling point of the non-solvent and permit higher printing temperatures. The temperature of the non-solvent also should be selected such that it does not induce an undesirable phase change of the printed polymer, does not exceed a decomposition temperature of a given polymer, does not exceed an activation temperature for a catalyst in polymeric solution (e.g., a catalyst for subsequent curing/crosslinking). In embodiments, the temperature of the non-solvent ranges from about 0° C. to about 80° C. or up to the non-solvent boiling point, for example at least about 0, 5, 20, 25, 30, 35, 40, 45, 50, 55, or 60° C. and/or up to about 5, 10, 15, 20, 30, 40, 45, 50, 55, 60, 65, 70, 75, 80° C., or the non-solvent boiling point. In embodiments, the non-solvent has a temperature of about 0° C. to about 15° C., about 20° C. to about 80° C., or about 30° C. to about 80° C. Alternatively or additionally, the foregoing temperature ranges independently can apply to the temperature of the polymeric solution, for example as it is being injected into the non-solvent.

In embodiments, the non-solvent includes a salt. The salt can be present in an amount up to about 8 wt. %, 12 wt. %, or 20 wt. %, for example at least about 0.01, 0.1, 0.2, 0.5, 1, 2, 3, 4, or 5 wt. % and/or up to about 3, 4, 5, 6, 7, 8, 10, 12, 15, or 20 wt. %, based on the total weight of the non-solvent. The amount of the salt can depend on the particular polymer/solvent/non-solvent pairings, and can be tuned to provide the desired porosity and/or density to the 3D polymeric article, for example by further decreasing the solubility of the polymer in the non-solvent. In general, the salt can include any inorganic salt, insofar as the salt does not have a spontaneous chemical reaction with the polymer and/or the solvent in the polymeric solution. In embodiments, the salt includes sodium chloride. More generally, the salt can be alkali metal or alkaline earth metal salt of a halide, inorganic anion, organic anion, etc. The salts are suitably included in a non-solvent including water as the main or sole non-solvent, but salts can also be included in other polar non-solvents such as methanol, ethanol, etc.

Additive Manufacturing Apparatus & Printing Parameters

The methods of the disclosure can be performed using an additive manufacturing apparatus, as described herein. The additive manufacturing apparatus of the disclosure can include a reservoir adapted to receive a non-solvent therein, (optionally) a printing substrate in the reservoir, an injection head adapted to deliver a polymeric solution into the non-solvent in the reservoir, and a temperature control means adapted to control or adjust the temperature of at least one of the non-solvent in the reservoir and polymeric solution delivered by the injection head.

FIG. 1 illustrates a side view of exemplary additive manufacturing apparatus 100 according to the disclosure. As shown in FIG. 1, the additive manufacturing apparatus 100 can include a reservoir 110 as a vessel or other container with the non-solvent 120 therein. In some embodiments, the reservoir 110 can be in fluid communication with a source of non-solvent (e.g., an inlet feed line of non-solvent; not shown). The apparatus can further include an injection head 130 (e.g., a syringe with a dispensing needle). In some embodiments, the injection head 130 can be a syringe with a dispensing needle or other print head 132 structure. The polymeric solution can be loaded in the injection head 130. In some embodiments, the apparatus can include an additional (second) reservoir in fluid communication with the injection head 130. The additional reservoir can be an internal syringe volume as shown, an external supply or feed line 136 for delivering polymeric solution components from an external reservoir of polymeric solution (not shown), etc. In any case, the additional reservoir can include polymeric solution loaded therein, which can be pumped or otherwise dispensed therefrom to the injection head 130 and into the reservoir 110 and non-solvent 120. The apparatus 100 can further include a means 140 to adjust the height and lateral position of the injection head 130. For example, conventional programmable robotic devices can be similarly used as the mean 140 to adjust the (vertical) z-direction positon, the (lateral) x-direction placement, and/or the (lateral) y-direction placement of the injection head 130 as illustrated in FIG. 1 by the Cartesian coordinate axes. A printing substrate 230 can be immersed in the non-solvent 120. In some embodiments, the printing substrate 230 can be mounted or otherwise placed in the reservoir 110 volume to receive printed/precipitated material. The printing substrate 230 can include a film coating 240, as described herein. The apparatus 100 can be used to print a 3D polymeric article 250. For example, the injection head 130 can be moved in a pre-determined/pre-programmed 3D trajectory while dispensing the polymeric solution 134 from the print head 132 into the non-solvent 120 in a 3D pattern corresponding to the desired eventual shape of the 3D polymeric article 250. Optionally, the apparatus 100 can include a temperature control means 260 adapted to control or adjust the temperature of the non-solvent 120 in the reservoir 110 and/or the polymeric solution 134 delivered by the injection head 130. Temperature control can include either or both or heating and cooling, for example relative to the ambient environment (e.g., relative to a temperature of about 20-25° C.). The temperature control means 260 can be adapted to control the temperature of the polymeric solution in the injection head 130, and/or the temperature of the non-solvent 120 in the reservoir 110, for example by controlling the temperature of the reservoir 110 itself and/or controlling the temperature of the non-solvent 120 within the reservoir 110. In embodiments, the temperature control means 260 can be adapted to control the temperature of the printing substrate 230, such as a hot plate. The form of the temperature control means is not particularly limited, and any suitable conventional device can be used for this purpose. For example, the temperature control means 260 can include a heating and/or cooling jacket or surface adjacent to or incorporated into one or more of the reservoir 110, the injection head 130 (e.g., syringe needle), the polymer solution reservoir (e.g., syringe body or external reservoir), etc. A heating/cooling jacket can be adapted to receive relatively hotter or colder heat transfer fluids flowing therethrough to heat or cool the printing fluids. Electrical coils or other heating structures can be used to heat the printing fluids. As described above, the temperature achieved and maintained by the temperature control means 260 can be selected to control the porosity of the printed 3D polymeric article 250.

The printing substrate can be any substrate to which the polymer in the polymeric solution can adhere. In embodiments, the printing substrate is a glass plate. In embodiments, the printing substrate can include a film coating, for example, to improve the adhesion of the polymer in the polymeric solution to the substrate. In embodiments, the film coating includes the polymer of the polymeric solution. For example, if the desired 3D polymeric article included PVDF, the printing substrate can include a PVDF film coating.

In embodiments, the injection head includes a dispensing needle having a diameter of about 24-gauge (305 μm) to about 30-gauge (150 μm). For example, the dispensing needle can have a diameter of about 30-gauge, 28-gauge, 26-gauge, or 24-gauge. Smaller gauge-needles (e.g., 30-gauge) can be used to prepare micro-scaffold structures, for example as shown in FIGS. 9A and 9B. As the diameter of the dispensing needle increases, the 3D polymeric article generally has lower resolution.

In embodiments, injecting the polymeric solution into the non-solvent includes contacting the injection head and the printing substrate to apply a first layer of the polymer to the printing substrate; and, applying a plurality of layers of the polymer, each layer being applied to a previous layer, until the 3D polymeric article is formed. In general, in order to prevent the printed article from sticking irreversibly to the film substrate, the first two layers of all prints are printed as low infill percentage raft layers. Each layer of the plurality of players can be applied at a continuous printing speed of about 5 mm/s to about 12 mm/s, for example at least about 5, 6, 7, 8, or 9 mm/s and/or up to about 8, 9, 10, 11, or 12 mm/s.

The polymeric solution can be injected into the non-solvent at a variety of suitable temperatures, for example at about room/ambient temperature (about 25° C. or about 20-25° C.), at a low temperature (e.g., about 15° C. or less), or at an elevated temperature (e.g., at least about 30° C.). As described above, a controlled or selected temperature for the precipitation process can be used to control the corresponding porosity or density of the printed article. As described above, the temperature of the injection can relate to the temperature of the non-solvent and/or to the temperature of the polymeric solution, which can be controlled by the temperature control means. In embodiments, the polymeric solution is injected into the non-solvent at a temperature of about 15° C. or less, for example about 15, 14, 13, 12, 11, 10, 5, 0, −5, −10, −15° C. or less. In general, the temperature of the injection can be as low as would be required to maintain a fluid non-solvent and a fluid polymeric solution (e.g., greater than the crystallization temperature of the polymer or any additives in the polymeric solution, or greater than the freezing point of the solvent, etc.). In embodiments, the polymeric solution is injected into the non-solvent at a temperature of at least 30° C., for example at least about 30, 35, 40, 45, 50, 55, 60, 65, 70, 75, 80, 86, 90, 95, or 100° C. and/or up to about 50, 60, 70, 80, 90, 100, 110, or 120° C., or the (minimum) boiling point of the solvent and non-solvent. In some embodiments, the polymeric solution and the non-solvent can both be heated or cooled (e.g., to substantially the same temperature or different temperatures). In other embodiments, only one of the polymeric solution and the non-solvent is heated or cooled, for example where the other liquid remains at substantially ambient or room temperature (e.g., about 20-25° C.).

Each of the plurality of layers can be applied at a pressure of about 1.0 psi (6.9 kPa) to about 30.0 psi (207 kPa), for example at least about 1 psi (6.9 kPa), 2 psi (13.8 kPa), 3 psi (20.7 kPa), 4 psi (27.5 kPa), 5 psi (34.5 kPa), 10 psi (68.9 kPa), 15 psi (103 kPa), or 20 psi (138 kPa) and/or up to about 10 psi (68.9 kPa), 15 psi (103 kPa), 17 psi (117 kPa), 20 psi (138 kPa), 23 (159 kPa), 25 (172 kPa), 27 (186 kPa), or 30 psi (207 kPa). In embodiments, the pressure used to apply each layer is continuous. For example, to prevent clogging of the polymeric solution in the injection head, the velocity of the injection head can be increased between the application of each layer of the plurality of layers (e.g., to a non-printing speed of at least about 60 mm/s) while maintaining a continuous pressure or flow of the polymeric solution. Without intending to be bound by theory, the increased non-printing speed (e.g., as compared to the printing speed) results in features in the 3D polymeric article that are much thinner than those made at the printing speed, which contribute negligibly to the final 3D polymeric article.

Each layer of the plurality of layers can have a thickness of about 0.03 mm to about 1 mm, for example at least about 0.03, 0.05, 0.07, 0.10, 0.15, or 0.20 mm and/or up to about 0.1, 0.2, 0.5, 0.8, or 1.0 mm.

The polymeric solution can be injected into the non-solvent in the pre-determined 3D pattern at two or more different orientations, or angles, relative to a reference plane. For example, each layer of the 3D polymeric article can be applied by alternating angles between layers. An orientation or angle of 0° indicates that the orientation of the injection head is parallel to the layer, for example, the layer is applied by dragging the injection head across the surface of the article in the x-y plane. An orientation or angle of 90° indicates that the orientation of the injection head is perpendicular to the layer, for example, the layer is applied by injecting the polymeric solution from above onto the article. The angle of the injection can impact the mechanical strength of the 3D polymeric article. In some embodiments, the 3D polymeric article is prepared using a parallel (i.e., 0°) injection orientation. In some embodiments, the 3D polymeric article is prepared using a perpendicular (i.e., 90°) injection orientation. In embodiments, the 3D polymeric article is prepared using alternating (e.g., every other layer, every two layers, or randomly) parallel (i.e., 0°) and perpendicular (i.e., 90°) injection orientations. Using alternating injection orientations can reduce or eliminate anisotropy of the 3D polymeric article in terms of one or more of its mechanical strength properties. For example, when an article is printed with the injection head uniformly in the same orientation during the printing process, the resulting article can be relatively anisotropic, tending to be mechanically stronger in certain directions and weaker in others, where "direction" refers to a particular direction of applied stress/strain relative to the article. In some cases, anisotropic mechanical properties can be desirable, for example when strength is important for a specific direction, but not others. Alternatively, when an article is printed with the injection head in varying orientations during the printing process, the resulting article can be relatively more isotropic/less anisotropic, tending to have mechanical strength properties that are the same or similar in all directions, at least compared to an anisotropic article printed in a single orientation.

The methods of the disclosure can further include curing the 3D polymeric article, e.g., when the polymer includes a thermoset polymer, and a corresponding thermosetting resin is printed during the injection/precipitation step. In some embodiments, the 3D polymeric article can be cured by the application of heat, for example at a temperature of about 50° C. or 100° C. to about 200° C., for example at least about 50, 70, 85, 100, 105, 110, 115, 120, 125, 140, or 150° C. and/or up to about 140, 150, 160, 170, 175, 180, 190 or 200° C. In some cases, a higher curing temperature can be used to provide more crosslinks and a tougher corresponding final polymeric article. In such cases, however, material shrinkage can occur during a high-temperature curing process. A lower temperature for curing can be selected for less shrinkage. In other embodiments, the 3D polymeric article can be cured with UV radiation, for example at substantially ambient temperature (e.g., 20-25° C. or 15-30° C.) or at a heated temperature as above.

In embodiments, the method is free of solvent evaporation. That is, the methods of the disclosure do not require any steps requiring removal of the solvent to provide the 3D polymeric article, as any solvent is removed via diffusion upon injection of the polymeric solution into the non-solvent.

The directly printed polymeric material (e.g., forming the 3D polymeric article), prepared according to any one of the methods disclosed herein can have a density that is at least about 20% of the density of a fully dense material formed from the polymer. For example, the 3D polymeric article can have a density that is at least about 20, 25, 30, 35, 40, 45, 50, 60, or 70% and/or up to about 35, 40, 45, 50, 55, 60, 65, 70, 75, 80, 85, 90, or 95% of a fully dense material formed from the same polymer or polymers (if present as a blend). The 3D polymeric article can also be designed to have less than 100% infill, which can result in even lower values for overall structure density, for example expanding the foregoing ranges down to about 1, 2, 5, 10, or 15% overall structure density relative to a fully dense material formed from the polymer. In some embodiments, the printed polymeric material can be subjected to a compression post-processing step, such as hot-pressing, to reduce the internal porosity of the printed polymeric material and increase the corresponding density of the printed polymeric material. For example, after compression, the density value can be at least 80, 85, 90, or 95% and/or up to 95, 98, or 99% of the density of a fully dense material formed from the polymer. Suitable compression pressures can be at least 1, 2, 5, or 10 MPa and/or up to 20, 30, 40, or 50 MPa.

The directly printed polymeric material also can be characterized in terms of its porosity or internal void volume fraction, for example as the complement of the relative density above. For example, the 3D polymeric article can have a porosity that is at least about 5, 10, 15, 20, 25, 30, 35, 40, 45, 50, 55, 60, or 65% and/or up to 30, 40, 50, 55, 60, 65, 70, 75, or 80%. Similarly, compression or hot pressing can reduce the internal porosity of the printed polymeric material, for example to an internal porosity value of at least 1, 2, or 5% and/or up to 5, 10, 15, or 20%.

Piezoelectric Materials and Articles

In some aspects, the disclosure relates to a 3D polymeric article in the form of a piezoelectric material as well as an article formed by a precipitation printing method as disclosed herein. In some embodiments, the polymer component of the article and piezoelectric material can include poly(vinylidene fluoride) (PVDF). In a particular embodiment, the article and piezoelectric material can be incorporated into a piezoelectric energy harvester as a component thereof.

PVDF is suitable as a piezoelectric polymer due to its outstanding piezoelectric and ferroelectric properties amongst all polymers. Due to the strong electro-negativity of the fluorine atoms relative to hydrogen and carbon atoms, an electric dipole can form within the PVDF monomer chain to provide the basis of ferroelectricity. PVDF is categorized as a semi-crystalline polymer with multiple crystalline phases: alpha ($\alpha$), beta ($\beta$), gamma ($\gamma$), delta ($\delta$), and epsilon ($\epsilon$), resulting due to differences in chain conformation and dipole alignment within the crystallites. The commonly observed non-polar $\alpha$ phase has a TGTG' conformation, yet its polar $\delta$ phase arrangement consists a negligible fraction in PVDF unless induced through electric poling with a high electric field. The polar $\gamma$ phase has a $T_3GT_3G'$ conformation, while its non-polar form $\epsilon$ phase also exists but is not commonly observed in PVDF. The highest polarity $\beta$ phase has a TTT conformation, with all dipoles aligned to create a strong moment in the monomer chain, providing $\beta$ phase PVDF with the best piezoelectric properties relative to all other crystalline phases.

Accordingly, in some embodiments, it can be desirable to increase the fraction of the piezoelectric $\beta$ phase within the polymer to improve the piezoelectric properties of PVDF. For example, the PVDF can be characterized as having a relatively high beta ($\beta$) crystalline phase content and/or a relatively high combined beta ($\beta$)+gamma ($\gamma$) crystalline phase content. The content of the crystalline phase(s) can be expressed on a weight, molar, or number basis relative to the PVDF as a whole and/or relative to the crystalline content of the PVDF. For example, the beta ($\beta$) phase content can be at least 40, 50, 60, 70, or 80% and/or up to 60, 70, 80, 90, or 95%. Alternatively or additionally, the combined beta ($\beta$) and gamma ($\gamma$) phase content can be at least 70, 80, 85, 90, or 95% and/or up to 80, 90, 95, 98, 99, or 100%. Alternatively or additionally, the gamma ($\gamma$) phase content can be at least 5, 10, 15, 20, or 25% and/or up to 15, 20, 25, 30, or 40%. Alternatively or additionally, the alpha ($\alpha$), delta ($\delta$), and/or epsilon ($\epsilon$) phase content can be not more than 1, 2, 5, 7, 10, or 15% and/or at least 0.01 or 0.1%. In some aspects, the disclosure relates to a PDVF material having the foregoing crystalline phase distribution, a corresponding piezoelectric 3D polymeric article formed from or otherwise including the PDVF material, and/or a PDVF material formed by the precipitation printing methods disclosed herein and having the foregoing crystalline phase distribution.

In some embodiments, the various disclosed precipitation printing methods can be extended to include one or more post-processing operations on the 3D polymeric article after precipitation. The additional post-processing operations can be used to improve piezoelectric properties of the 3D polymeric article, for example when PVDF is included as a piezoelectric polymeric material. Example post-processing operations that can reduce porosity and/or increase beta (β) phase content (e.g., for PVDF) include annealing, hot-pressing, and/or poling. The annealing, hot-pressing, and poling are suitably performed at elevated temperatures, for example at least 50, 60, 70, 80, or 100° C. and/or up to 80, 90, 100, 120, or 150° C., being independently selected for each process. Annealing and poling can transform gamma (γ) phase into beta (β) phase in the PVDF. Annealing generally involves heating the printed polymer material above its recrystallization temperature (e.g., but below its melting temperature), maintaining the elevated temperature for a selected time, and then cooling. Hot pressing is suitably performed at a sufficient pressure (e.g., 10-50 MPa) to compress and reduce the internal porosity of the printed polymeric material, for example up to 5, 10, or 15% and/or at least 1, 2, or 5% internal porosity. Alternatively or additionally, the reduction in porosity can be expressed as a density value that is at least 85, 90, or 95% and/or up to 95, 98, or 99% of the density of a fully dense material formed from the polymer. Poling (e.g., direct field poling) is suitably performed with the printed PVDF in a heated liquid medium (e.g., an oil bath) and with application of a strong electric field.

In some aspects, the disclosure relates to piezoelectric energy harvester incorporating a piezoelectric 3D polymeric article according to the disclosure (e.g., formed by the precipitation printing methods herein). A piezoelectric energy harvester generally includes a piezoelectric 3D polymeric article (e.g., including PVDF) as a substrate or layer of material with electrode(s) thereon, for example at least one electrode on each of two opposing or separate surfaces of the substrate. Electrical connections to the electrodes (e.g., metallic wires, metallic tapes, etc.) can collect and transmit electrical energy transformed from mechanical energy by the energy harvester, for example to a battery or any conventional electrical/electronic for storing or using the electrical energy.

Figure 16A:
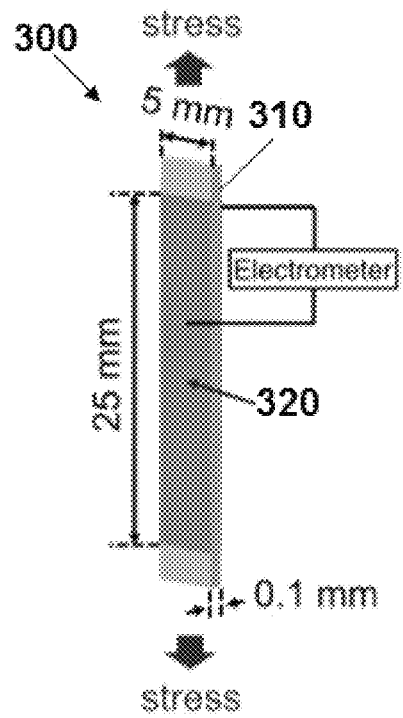
FIG. 16A is a schematic of a stretching mode energy harvester apparatus according to the disclosure.

FIG. 16A is a perspective view of a stretching mode (e.g., $d_{31}$ mode) energy harvester 300 that transforms waste mechanical energy from axial displacement into usable electrical energy (e.g., indicated by the stress or stretching arrows in the figure). The energy harvester 300 includes a piezoelectric polymeric substrate 310, for example a PDVF substrate precipitation printed according to the disclosure, for example with one or more post-processing steps such as annealing, compression/hot pressing, and/or poling. The energy harvester 300 further includes electrodes 320 on opposing sides of the polymeric substrate 310 (only illustrated on one side in FIG. 16A), which can be electrically connected to a battery or other electrical load (not shown).

Figure 16B:
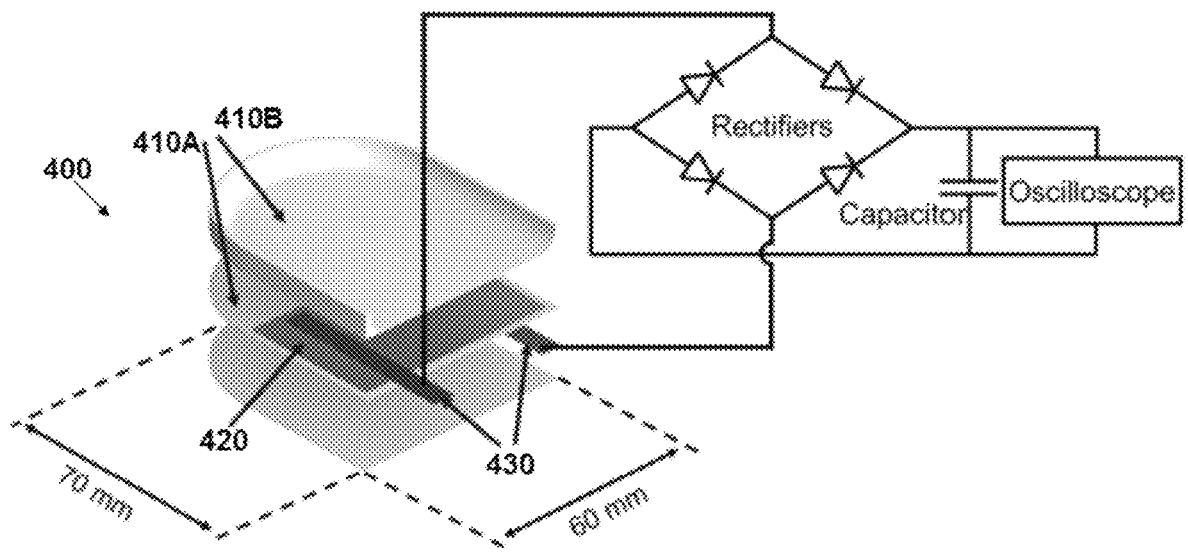
FIG. 16B is a schematic of a longitudinal mode energy harvester apparatus according to the disclosure and in the form of a heel insole.

FIG. 16B is a perspective view of a longitudinal mode (e.g., $d_{33}$ mode) energy harvester 400 that transforms waste mechanical energy from a compressive displacement into usable electrical energy (e.g., a downward compression force from a user's foot for the illustrated insole). The energy harvester 400 includes first and second piezoelectric polymeric substrates 410A and 410B, for example PDVF substrates precipitation printed according to the disclosure, for example with one or more post-processing steps such as annealing, compression/hot pressing, and/or poling. The energy harvester 400 further includes electrodes 420 on opposing sides of the first polymeric substrate 410A (only illustrated on one side in FIG. 16B), which can be electrically connected to a battery or other electrical load (not shown) via copper tape (or other metallic/conductive material) 430 on each electrode 420. The two polymeric substrates 410A and 410B can be layered or sandwiched together, for example having one of the electrodes 420 therebetween, to form a composite shape corresponding to the final article (e.g., a shoe insole as illustrated).

It is to be understood that while the disclosure is read in conjunction with the detailed description thereof, the foregoing description and the following examples are intended to illustrate and not limit the scope of the disclosure, which is defined by the scope of the appended claims. Other aspects, advantages, and modifications are within the scope of the following claims.

Examples 1-7

Methods and Materials

A custom-designed 3D printer was prepared, based on a Cartesian gantry system (AGS1500, AEROTECH) (FIG. 1). Needle toolpaths for precipitation prints were made using the open-source extruder toolpath software (Slic3r) from .STL files made in CAD drawing software (SOLIDWORKS, DASSAULT SYSTÈMES). During printing, the needle tip remained in the non-solvent until the print was finished. Furthermore, the pressure applied to the solution in all prints was never paused during a print, even during the non-printing movement steps to prevent clogging of the dispensing needle due to precipitation of the polymer inside the needle tip. The continuous flow of the print solution did not significantly affect the quality of the final prints, as the non-printing movements were set at much higher velocities (60 mm/s) than that of the printing movements, thus features from the non-printing movements were much thinner than those made at printing speed.

The printing substrate for all precipitation prints was a flat glass plate inside a non-solvent reservoir, and a thin film of the same solute polymer (unless otherwise provided) was doctor bladed on the glass plate to enable adhesion with the substrate through diffusion bonding. To improve the adhesion of the doctor bladed film to the glass plate, the film was first allowed to solidify from solution at 100° C., then heated up to a temperature above the melting point of the polymer and then allowed to cool down slowly to room temperature.

Each of the printing solutions was loaded into a 10 mL syringe with a stainless-steel dispensing needle. The needle size ranged from 24-gauge (305 µm) to 30-gauge (150 µm) for different printing solutions (as provided below) and to achieve variation in the print speed and resolution. Pressure was applied to the solution between 1.0 psi (6.9 kPa) to 30.0 psi (207 kPa) (as provided below) using a high precision dispenser (ULTIMUS V, NORDSON EFD) such that a constant flow rate was obtained.

The density of printed samples was measured by 20 mm×20 mm×2 mm square samples. The resulting prints were then fully dried under vacuum, and their dimensions were then measured with calipers to account as much as possible for any shrinking or printer errors.

Tensile tests of the printed samples with the same printing parameters for the density measurement samples were performed according to ASTM D1708 standard. This standard has been used to measure tensile properties of plastics by using microtensile specimens. Since 3D printed structures may have anisotropic properties, different tool path prints were tested. All 3D printed samples were 10 layers thick (0.5 mm thickness in total) and were printed with the standard specimen shape according to ASTM D1708. All deviation of the final samples from the desired dimensions was noted and accounted during Young's modulus, tensile strength and tensile strain calculations. Printed samples were tested for 3 different printing infill patterns: all 0° from the load axis (parallel), all 90° from the load axis (perpendicular), and 0°/90° alternating layer by layer.

Example 1—Preparation and Evaluation of PVDF Polymeric Articles

A printing solution including 15 wt. % poly(vinylidene fluoride) (PVDF) powder (KYNAR 301F, average molecular weight ~534,000) was prepared by dissolving the PVDF in N,N-dimethylformamide (DMF) (FISHER CHEMICAL) through a combination of shear mixing and sonication until a uniform solution was achieved. The non-solvent selected to precipitate PVDF was water to ensure rapid precipitation rate due to the hydrophobic characteristic of PVDF and the high solubility of DMF in water.

With a 26-gauge needle, the printing pressure was set to be 2.5 psi (17.2 kPa) and the printing speed was 7 mm/s to guarantee both printing quality and printing speed. The distance between layers (layer height) was 0.05 mm and the extrusion width was set to be 0.2 mm to avoid gaps between adjacent printing paths. 3D printed articles were prepared according to the methods described above.

Figure 2A:
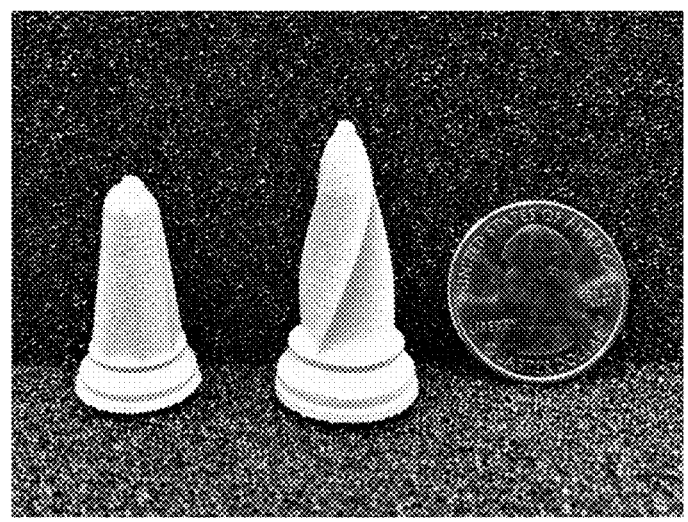
FIG. 2A is an image of 3D polymeric articles comprising poly(vinylidene fluoride) (PVDF) prepared according to the methods of the disclosure.
Figure 2B:
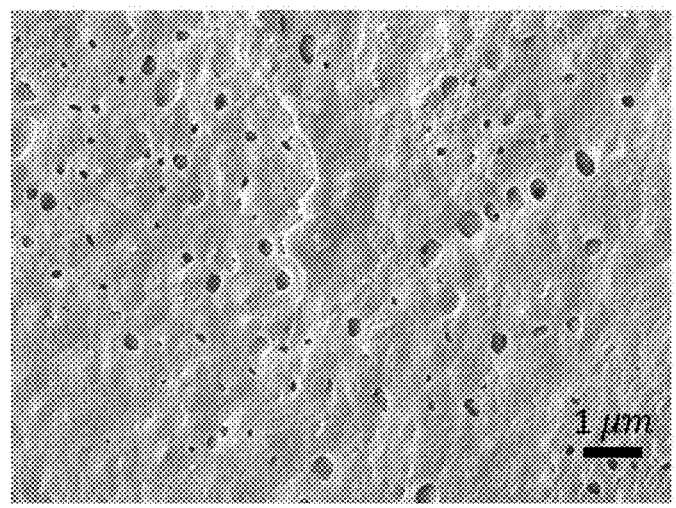
FIG. 2B is a scanning electron microscopy (SEM) image of the porous top surface of a 3D polymeric article comprising PVDF prepared according to the methods of the disclosure.
Figure 2C:
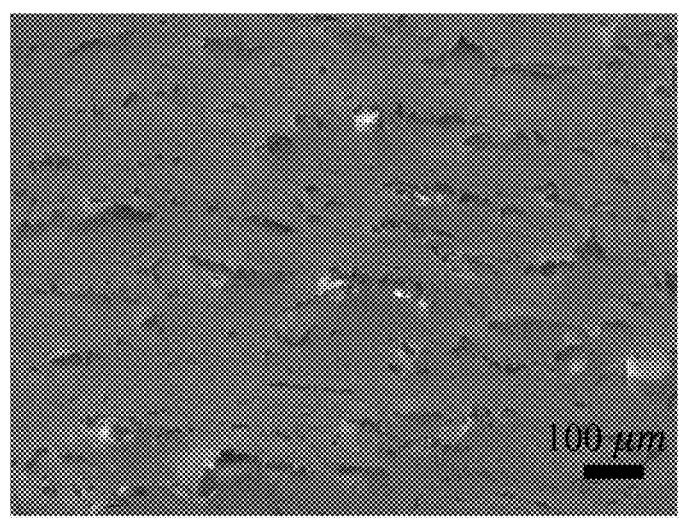
FIG. 2C is an SEM image of a cross-section of a 3D polymeric article comprising PVDF and having a layer height of 100 μm prepared according to the methods of the disclosure

FIG. 2A shows printed PVDF chess pieces, which demonstrated high resolution and uniform structure over the build height. The printed pieces had a high resolution up to 200 μm in x-y plane (the horizontal plane) and 50 μm in z direction (the vertical direction). However, the surface of precipitation printed samples was still rough due to the porous characteristic of its microstructure, which is shown by scanning electron microscope (SEM) images in FIGS. 2B & 2C. As shown in FIG. 2B, the PVDF prints were highly porous, however, the layers of the prints were well adhered to one another, and the material filled the printed volume well, as seen in FIG. 2C, which indicated no layer separation.

Density measurements were performed on the PVDF samples and are provided in Table 1, below. Specifically, the density of fully filled precipitation printed PVDF was 0.65±0.01 g/cm$^3$, which was only 36% of fully dense commercial PVDF having a density of 1.78 g/cm$^3$, and was also much lower than material extrusion printed PVDF (1.51-1.67 g/cm$^3$) reported in the prior art.

Results from the tensile tests of the PVDF printed samples are shown in FIG. 6. As shown in FIGS. 6A-6D, the PVDF sample printed in the direction parallel to the infill pattern had the highest Young's modulus, tensile strength and tensile strain, and the PVDF sample printed in the direction perpendicular to the infill pattern had the lowest Young's modulus, tensile strength and tensile strain, while the PVDF sample printed in alternating infill direction was in between. The samples printed in the 0° direction exhibit a high tensile strain to failure of 180% in the direction parallel to the infill pattern was observed, which was much higher than the tensile strain when printed in the 90° direction and an alternating pattern. The stress-strain curve is shown in FIG. 6D and demonstrates a large yielding region of significantly increased strain with only slightly increasing stress which was due to the uniaxial drawing of the polymer. This indicated that the printed PVDF was compliant and plastic in the printing direction where the material is continuous. When stressed perpendicular to the infill pattern, the small voids present between adjacent tool paths lead to defects that weakened the mechanical properties of the polymer, especially for tensile strain because cracks were initiated near the voids which ultimately lead to failure prior to drawing of the polymer. The tensile strength for samples printed in the 0° direction was approximately 4 MPa, which is significantly lower than fully dense PVDF (60 MPa), however the tensile strain to failure of the printed PVDF (180%) was higher than commercial fully dense PVDF (20%-150%).

Figure 7:
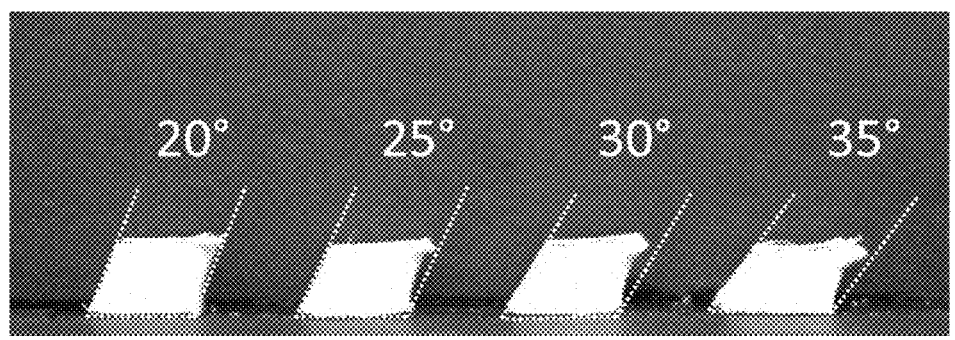
FIG. 7 is an image of the printing capability of overhang structures comprising PVDF prepared according to the methods of the disclosure.

Printed overhang structures without supports are shown in FIG. 7, where four inclined four prism with overhang angles 20°, 25°, 30° and 35° were made of PVDF. From the result of the prints, overhang angles less than 20° were suitable for the precipitation printing of PVDF in DMF solution. Larger than 25° overhang angles result in significant warping and shrinkage of the overhang surface. However, the overhang ability largely depends on the solvent diffusion rate in the non-solvent. Without intending to be bound by theory, it is believed that if the solvent had a higher diffusion rate (e.g. acetone diffusing in water), the overhang angle could be further improved.

Example 2—Preparation of PMMA Polymeric Articles

A printing solution including 25 wt. % poly(methyl methacrylate) (PMMA) (SIGMA-ALDRICH, average molecular weight ~120,000) was prepared by dissolving the PMMA in acetone (SIGMA-ALDRICH) through a combination of shear mixing and sonication until a uniform solution was achieved. The non-solvent selected to precipitate PMMA was water due to the high diffusion rate of acetone to water.

With a 26-gauge needle, the printing pressure was set to be 2.0 psi (13.8 kPa) and the printing speed was 7 mm/s. The layer height was 0.05 mm and the extrusion width was set to be 0.4 mm to both ensure high fill percentage and avoid overlapping of precipitated PMMA due to its rigidity. 3D printed articles were prepared according to the methods described above.

Figure 3:
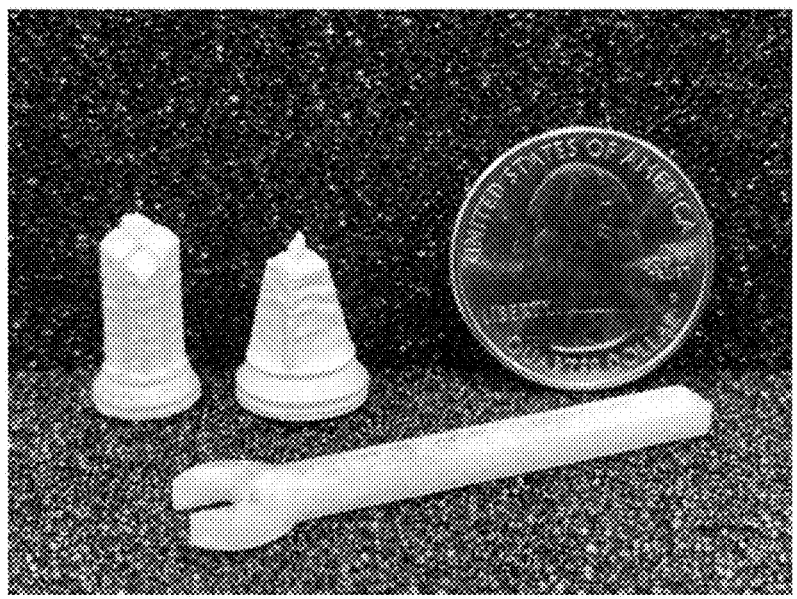
FIG. 3 is an image of 3D polymeric articles comprising poly(methyl methacrylate) (PMMA) prepared according to the methods of the disclosure.

FIG. 3 shows a printed PMMA wrench and printed PMMA towers. Due to the porous microstructure of the printed PMMA, the samples were not as transparent as commercial PMMA sheets. However, the PMMA articles showed improved structure over the printed PVDF articles. FIG. 3 shows that the PMMA wrench with 100% infill density is more transparent than the two PMMA towers with 80% infill density.

Density measurements were performed on the PMMA samples and are provided in Table 1, below. Specifically, the density of fully filled precipitation printed PMMA was 1.02±0.02 g/cm$^3$, which was 87% of fully dense PMMA having a density of 1.18 g/cm$^3$, and shows a much lower porosity than 3D-printed PVDF due to the increased miscibility and diffusion rate between the solvent and non-solvent.

TABLE 1

Printed PVDF and PMMA Printing & Density Properties

| | | PVDF | PMMA |
| --- | --- | --- | --- |
| Printing settings | Needle size | 26-gauge (254 μm) | 26-gauge (254 μm) |
| | Printing speed (mm/s) | 7 | 7 |
| | Layer height (mm) | 0.05 | 0.05 |
| | Extrusion width (mm) | 0.2 | 0.4 |
| | Infill percentage | 100% | 100% |
| | Pressure | 2.5 psi (17.2 kPa) | 2.0 psi (13.8 kPa) |
| | Solution | 15 wt. % PVDF in DMF | 25 wt. % PMMA in acetone |
| Density | Measured density | 0.646 | 1.023 |

TABLE 1-continued

Printed PVDF and PMMA Printing & Density Properties

|  |  | PVDF | PMMA |
|---|---|---|---|
| properties | (g/cm³) | | |
|  | Fully dense material density (g/cm³) | 1.78 | 1.18 |
|  | Density percentage | 36% | 87% |

Figure 8A:
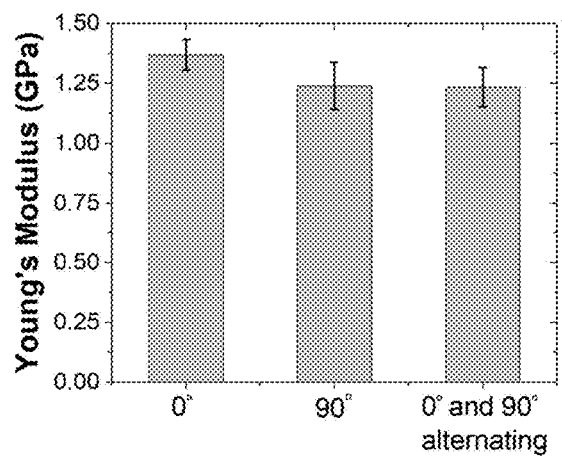
FIG. 8A is a graph of the Young's modulus of a 3D polymeric article comprising PMMA prepared according to the methods of the disclosure.
Figure 8B:
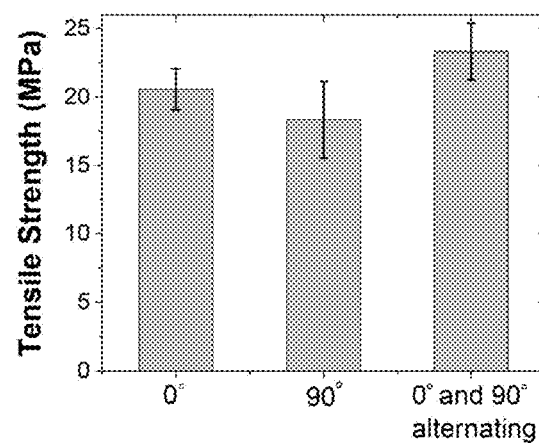
FIG. 8B is a graph of the tensile stress of a 3D polymeric article comprising PMMA prepared according to the methods of the disclosure.
Figure 8C:
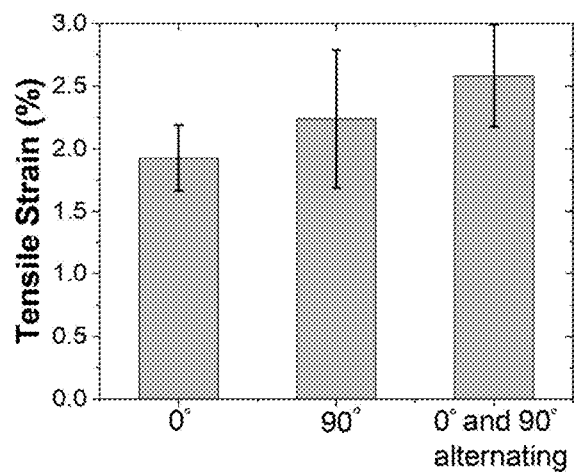
FIG. 8C is a graph of the tensile strain of a 3D polymeric article comprising PVDF prepared according to the methods of the disclosure.

Compared to the PVDF samples, the printed PMMA samples showed similar Young's modulus (1.2-1.4 GPa) for all infill patterns, as shown in FIG. 8A, and the highest tensile strength and tensile strain occurred with the 0°/90° alternating infill pattern, as can be seen in FIGS. 8B & 8C. The tensile samples exhibited crack formation and subsequent failure before large scale yielding which was due to the relatively small number of voids in the printed PMMA samples and discrete interfaces between adjacent printed traces of the polymer which led to failure in a similar manor as observed in material extrusion. For samples with a 0°/90° alternating infill pattern, the upper-layer material precipitation process allowed a defect-repair process by printing directly onto the lower-layer voids. Therefore, samples with a 0°/90° alternating infill pattern had fewer defects than the samples with a 0° or 90° infill pattern, and thus demonstrated higher tensile strength and tensile strain. Among all these infill patterns, the highest Young's modulus was 1.4 GPa and the highest tensile strength was 23.3 MPa, which is lower than fully dense PMMA (3.1 GPa Young's modulus and 72 MPa tensile strength).

However, compared with PMMA printing through other techniques, PMMA printed using the methods of the disclosure showed higher mechanical properties. For instance, material extrusion printed PMMA reported by prior art methods had a Young's modulus of 370 MPa and yield strength 16 MPa, while binder jet printed PMMA reported by prior art methods had a Young's modulus of 223 MPa and tensile strength 2.91 MPa. This result showed that the printing technique of the disclosure provide a new way to 3D print polymers with high strength and stiffness.

Examples 1 and 2 demonstrate that, based on the mechanical test results of the printed PVDF showing plastic behavior, and PMMA showing elastic behavior, there is potential to tailor material properties of 3D printed polymeric articles by choosing different solvent-polymer pairs through the printing techniques of the disclosure.

Example 3—Preparation of NBR Polymeric Articles

A printing solution including 25 wt. % acrylonitrile butadiene rubber (NBR) (KUMHO PETROCHEMICAL) was prepared by dissolving the NBR in DMF. The solution was sonicated for about 10 hours to obtain a homogeneous solution. Then, tert-butyl peroxybenzoate (98%, ALFA AESAR) was added to the printing solution in an amount of 2 wt. % of the dissolved NBR. Since the self-accelerating decomposition temperature (SADT) of tert-butyl peroxybenzoate is about 65.8° C., premixing it with NBR did not trigger chemical reaction at room temperature. The nonsolvent selected to precipitate NBR was water.

With a 26-gauge needle, the printing pressure was 30.0 psi (207 kPa) (due to the high viscosity of the NBR printing solution) and the printing speed was 8 mm/s. The layer height was 0.05 mm and the extrusion width was set to be 0.2 mm to ensure high fill percentage.

Figure 4A:
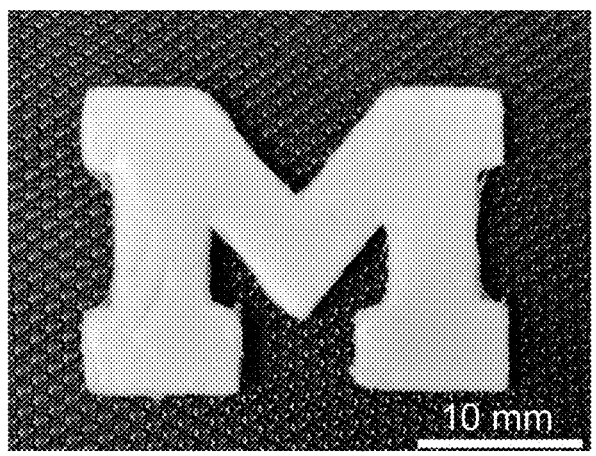
FIG. 4A is an image of an uncured 3D polymeric article comprising acrylonitrile butadiene rubber (NBR) prepared according to the methods of the disclosure.
Figure 4B:
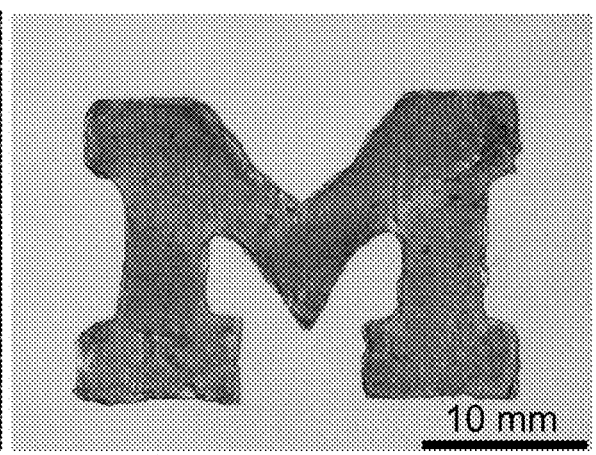
FIG. 4B is an image of a cured 3D polymeric article comprising acrylonitrile butadiene rubber (NBR) prepared according to the methods of the disclosure.

FIG. 4A shows a printed "block M" which was first printed as a mixture of NBR and the tert-butyl peroxybenzoate at room temperature and then dried in a vacuum chamber. The color of NBR before curing was cream and turned to brown after the curing process at 125° C. in an oven for 20 minutes to allow the tert-butyl peroxybenzoate to form radicals beyond its decomposition temperature (SADT) of 65.8° C., as shown in FIG. 4B. The precipitation technique allowed uniform mixing of the liquid catalyst (e.g., peroxide) with soluble rubber enabling a uniform cross-linked structure after curing. However, although the precipitation printing technique provided high precision 3D printing for an accurately finished part, it was difficult to maintain the dimensional stability during the elevated temperature curing process. Without intending to be bound by theory, it is believed that this could be avoided through the use of photoinitiator and in situ layer by layer photo-curing, however light penetration may be difficult for a submerged structure in the non-solvent.

Figures 12A, 12B, 12C:
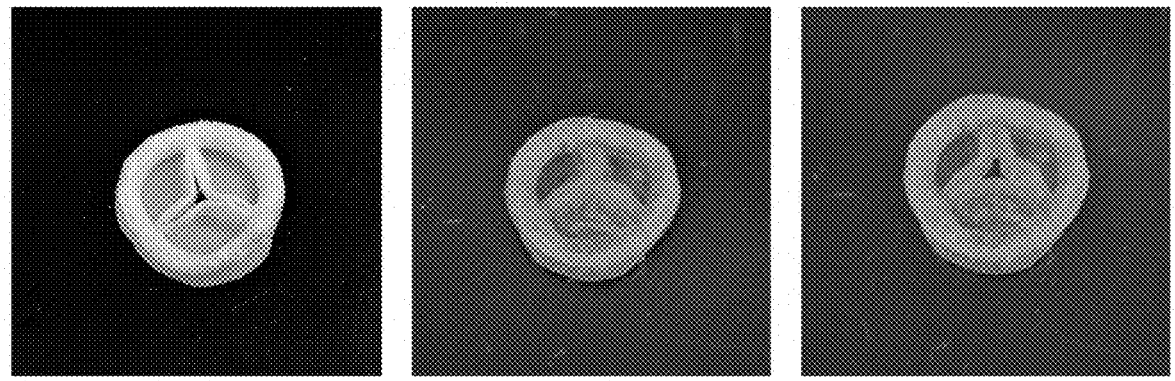
FIG. 12A is an image of an uncured 3D polymeric article (in the shape of a check valve) comprising NBR prepared according to the methods of the disclosure.
FIG. 12B is an image of an cured 3D polymeric article (in the shape of an open check valve) comprising NBR prepared according to the methods of the disclosure.
FIG. 12C is an image of an cured 3D polymeric article (in the shape of a closed check valve) comprising NBR prepared according to the methods of the disclosure.
Figure 13:
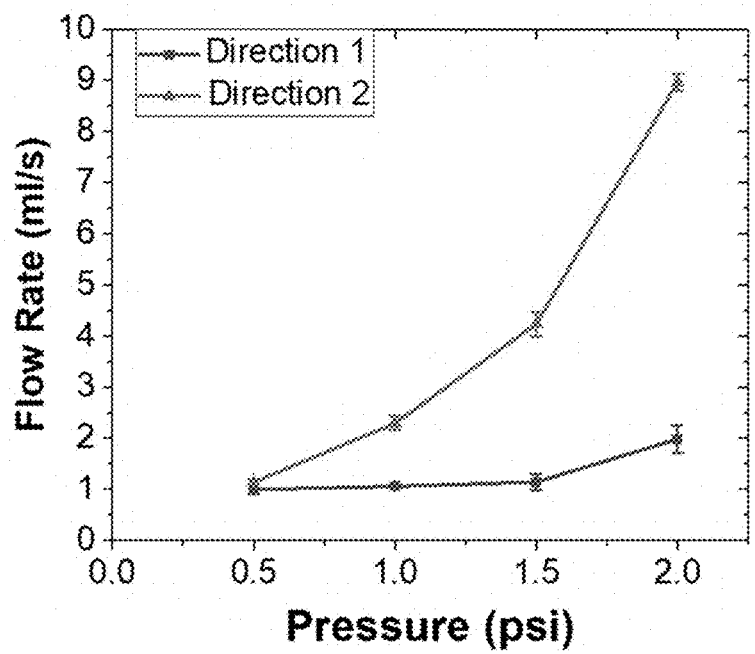
FIG. 13 is a graph of the flow rate-pressure relationship for two different flow directions for a 3D polymeric article in the form of a check valve (Direction 1: check valve facing up; Direction 2: check valve facing down).

FIGS. 12A-12C show a printed heart valve-shaped 3D printed check valve using the NBR printing solution. The valve was printed and cured using the parameters described above. The size of the printed check valve was 15 mm in diameter and 4 mm in height. The valve allowed flow to pass in one direction when the applied pressure opened the gap automatically and blocked flow in the other direction when the gap was sealed by the applied pressure. The flow rates in two directions (direction 1: flow came from the top side, direction 2: bottom side of the check valve) at different pressures were measured to verify the effectiveness of this check valve. The results in FIG. 13 show the check valve could restrict the flow rate to a low level (about 1 mL/s) from the top of the valve and it allowed flow rate to increase as the pressure rose in the other direction. Without intending to be bound by theory, it is believed that, based on these results, artificial heart replacement valves could be fabricated through the printing techniques of the disclosure by using biocompatible materials.

Example 4—Preparation of MWCNT-PVDF Nanocomposites

A printing solution including 0.9 wt. % multi-walled carbon nanotubes (MWCNTs) (CHEAP TUBES), 14.1 wt. % PVDF (KYNAR 301F, average molecular weight ~534,000) and 85 wt. % DMF was prepared. Accordingly, based on the amount of MWCNTs and PVDF in the solution, the final nanocomposite would have a weight fraction of 6 wt. % in the nanocomposite.

To prepare the solution, PVDF powder was first dissolved into DMF by shear mixing and sonication to obtain a clear solution. Then, MWCNTs were mixed in the PVDF solution by sonication and magnetic stirring overnight to obtain a well-dispersed nanocomposite solution. To assist the dispersion process, 1 wt. % of polyvinylpyrrolidone (PVP) (SIGMA-ALDRICH) in PVDF was also added to the solution as an emulsifier. As PVP is miscible in water, after the precipitation, all PVP added would be removed from the final printed product.

For the printing process, a thin doctor blade cast PVDF film was used as the printing substrate. The printing pressure was set to be 1.4 psi (9.7 kPa) and the printing speed was 7 mm/s with a 24-gauge needle. The layer height was 0.05 mm and the extrusion width was set to be 0.2 mm to ensure high printing resolution.

FIG. 5A shows two 3D printed MWCNTs-PVDF nanocomposite thin-walled tubes demonstrating the high aspect ratio and dimensional stability of the printing process. The nanocomposite tube had a wall thickness of 0.25 mm. FIG. 5B shows a SEM image of a 6 wt. % MWCNTs-PVDF nanocomposite sample. As can be seen in FIG. 5B, MWCNTs were randomly dispersed in PVDF as indicated by the arrows, allowing the printing of electrically conductive structures.

Figure 14:
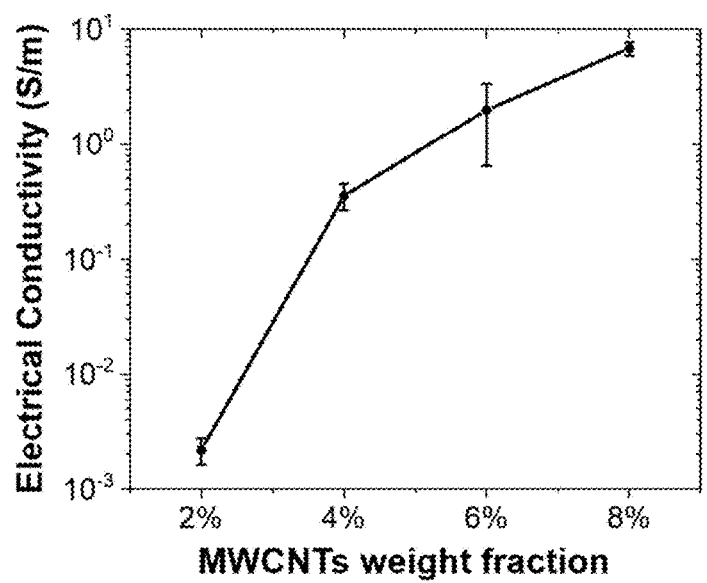
FIG. 14 is a graph of the electrical conductivity of a MWCNT-PVDF nanocomposite prepared according to the methods of the disclosure comprising various amounts of MWCNTs.

Additional MWCNT-PVDF nanocomposites were prepared in order to evaluate the effect of the amount of MWCNTs in the printing solution. Four weight fractions of MWCNTs in nanocomposites were tested: 2 wt. %, 4 wt. %, 6 wt. % and 8 wt. %, respectively. The relationship between electrical conductivity of MWCNTs-PVDF nanocomposite (measured at 1 kHz frequency) and the weight fraction of MWCNTs is shown in FIG. 14. As reference, virgin PVDF has a negligible electrical conductivity of $10^{-9}$ to $10^{-8}$ S/m at 1 kHz frequency. As shown in FIG. 14, there was a rapid increase in nanocomposite electrical conductivity when MWCNTs were increased from 2 wt. % to 4 wt. %. While the MWCNTs-PVDF nanocomposite's electrical conductivity continued to rise as the MWCNTs weight fraction increased, the solution became very viscous and prone to clogging of the nozzle when the weight fraction of MWCNTs was higher than 6 wt. %. After considering the electrical conductivity and the precipitation printing process, nanocomposites with 6 wt. % of MWCNTs were selected for precipitation printing. Two small 3D printed MWCNTs-PVDF nanocomposite tower structures were incorporated into an LED apparatus as electrodes. This demonstration showed the electrical conductivity of the 3D printed MWCNTs-PVDF nanocomposite, which had a total electrical resistance of the two structures in series of 16 kΩ.

Figure 15A:
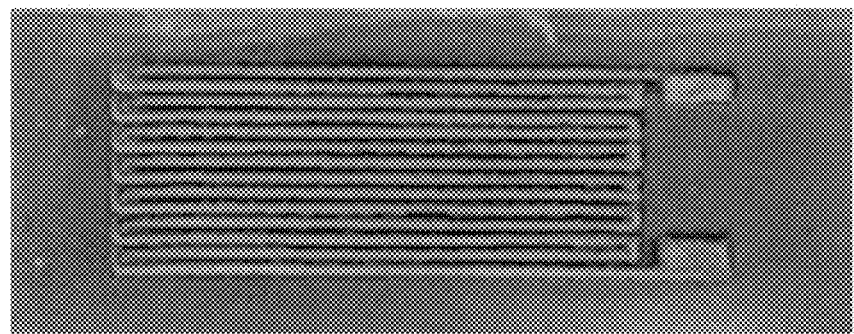
FIG. 15A is an image of a MWCNT-PVDF nanocomposite prepared according to the methods of the disclosure in the form of a strain gauge.
Figure 15B:
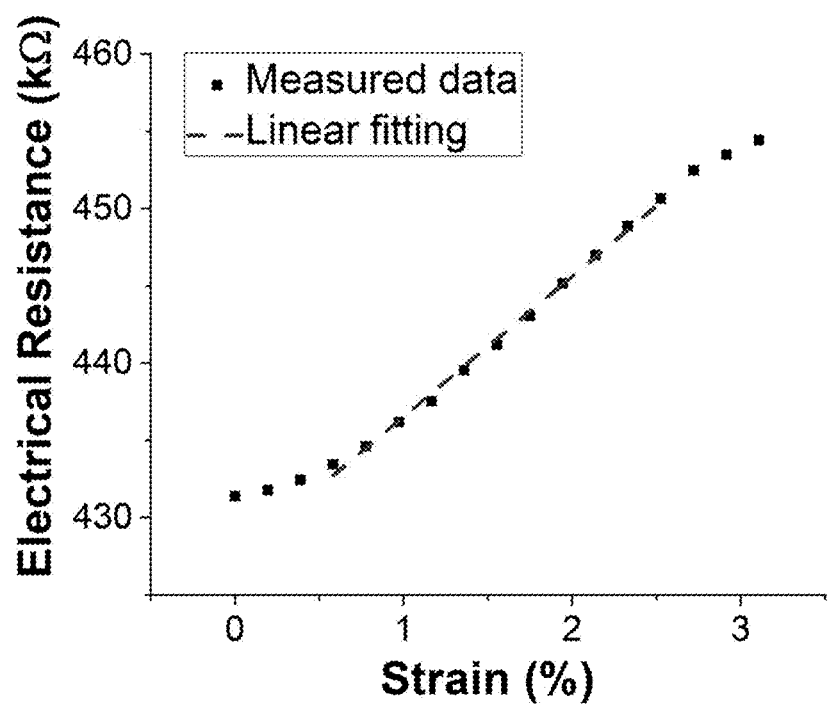
FIG. 15B is a graph of the electrical resistance-strain relationship of a MWCNT-PVDF nanocomposite prepared according to the methods of the disclosure in the form of a strain gauge.

The piezoresistance of the printed MWCNTs-PVDF nanocomposite was measured by printing a strain gauge with a fine parallel-grid pattern to increase the accuracy of strain measurement. FIG. 15A shows the 3D printed strain gauge on Kapton tape that was coated with thin layer of PVDF applied using a doctor blade. To assess the piezoresistivity, the electrical resistance of the 3D printed strain gauge was measured under varying levels of strain from 0 to 3.0% applied to the sample by an Instron Universal Testing Systems. The electrical resistance-strain relationship is shown in FIG. 15B and showed a trend with a linear region from 0.8% to 2.7% strain. The plot also shows two nonlinear regions: (1) at very low strains where MWCNTs inside PVDF matrix were still coiled or curled in the polymer followed by their extension and orientation, and (2) at larger strains followed by their slipping inside the polymer.

The gauge factor (GF) was measured from the 3D printed MWCNTs-PVDF nanocomposite to assess the device sensitivity. According to test results, the printed strain gauge had a gauge factor of 1.78, which was close to commercial metallic strain gauges, typically having a gauge factor of around 2. Therefore, the printing techniques of the disclosure provided a simple and cost-efficient way to manufacture strain gauges which are capable of linearly measuring strain range from about 0.8% to 2.7%. Furthermore, the conductive MWCNTs-PVDF strain gauges printed on Kapton tapes were soft and compliant, which could be easily bonded to other surfaces, even with some curvature, like gloves or human skin. The printing techniques of the disclosure also allowed for the printing of strain gauges onto existing surfaces or to be integrated into a print along with electrical traces such that a multifunctional material can be designed using additive manufacturing.

Example 5—Effect of Needle Size

The printing techniques of the disclosure can also be used to print micro-scale structures with high resolution. By using a small diameter needle (30-gauge), the printing resolution was increased up to 100 μm with a layer height of only 30 μm. The x-y position accuracy of the print was dictated by the positional accuracy of the gantry system, which was ±1.5 μm. This printing resolution was higher than that of the conventional material extrusion which typically has a 100 μm layer height and poor x-y resolution due to the high viscosity of the polymer melt. FIGS. 9A & 9B show a PVDF micro-scaffold structure which from the SEM image can be seen to have straight scaffold structures, therefore demonstrating the high printing precision of the printing process. The printing resolution was limited by the internal diameter of the needle and therefore a finer needle further enhanced the printing resolution. In this example, the layer height was 0.03 mm, the extrusion width was 0.15 mm, and the pressure was 4.0 psi; other printing parameters and the printing solution were the same as in Example 1.

Example 6—Effect of Non-Solvent Salinity

To characterize the effect of salinity, the density of PVDF printed with DMF/water pair was examined with a weight fraction of sodium chloride (NaCl) in water (i.e., non-solvent) ranging from 0 to 8 wt. %. In addition to the salinity, the printing pressure was also adjusted to ensure the maximum infill of the prints, while other printing parameters remained the same as those described in Example 1.

As shown in FIG. 10, with the increased salinity of the non-solvent, the printing pressure increased gradually, which indicated that more material was printed in the same volume of the sample, and resulted in an increased density. The porosity of the PVDF prints with 8 wt. % NaCl in water was 57%, which was slightly reduced compared to the 64% original porosity without any NaCl in water.

Example 7—Effect of Printing Temperature

Figure 11A:
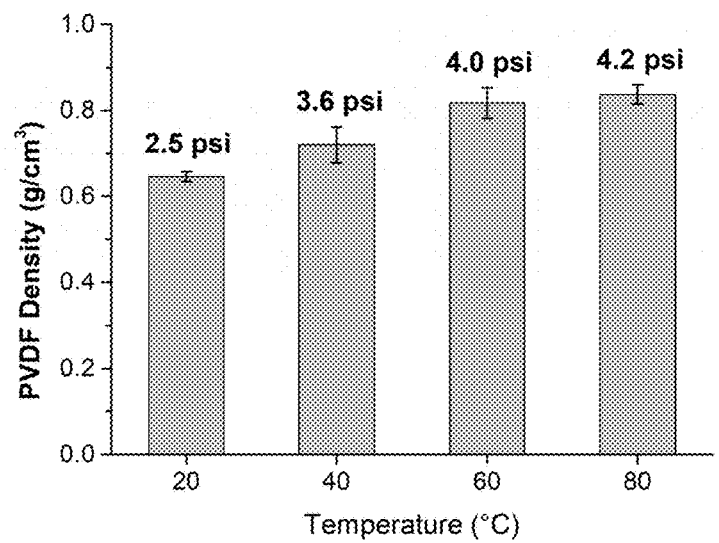
FIG. 11A is a graph of the effect of the printing temperature at various pressures on the density of a 3D polymeric article comprising PVDF prepared according to the methods of the disclosure.

The effect of the printing temperature on the density and mechanical properties of the PVDF printed polymeric articles was evaluated. The articles were prepared in accordance with Example 1, with the only difference being the pressure and the temperature of the non-solvent. As shown in FIG. 11A, by raising the non-solvent reservoir temperature, the density of the printed PVDF with DMF/water pair increased. The printing pressure listed for each temperature was selected in order to maximize the material infill in a fix volume. Notably, since the viscosity of the printing solution decreased as the temperature rose, the amount of the material dispensed out of the nozzle increased even if the pressure was set to be the same.

Figure 11B:
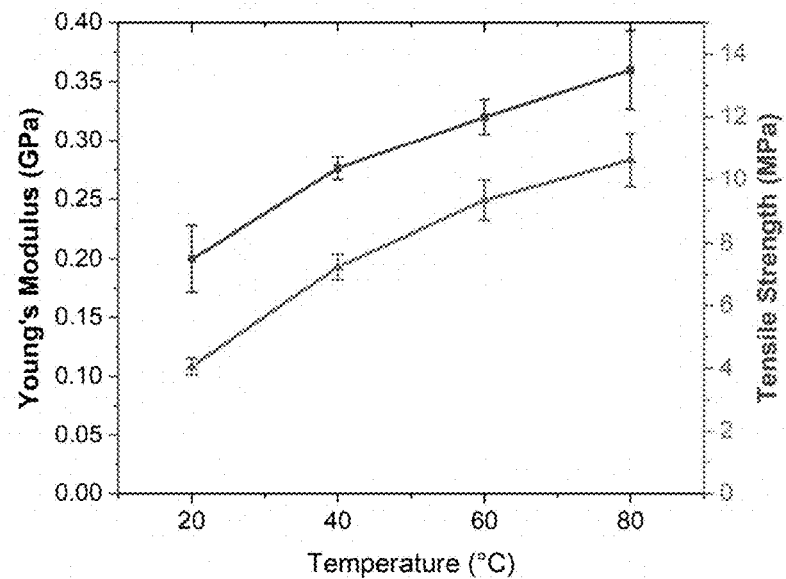
FIG. 11B is a graph of the influence of the printing temperature on the Young's modulus and tensile strength of a 3D polymeric article comprising PVDF prepared according to the methods of the disclosure.

The mechanical properties of the PVDF prints were further characterized for different printing temperatures. FIG. 11B shows the significant improvement of Young's modulus of PVDF prints with parallel infill direction, which changed from 0.20 GPa (20° C.) to 0.36 GPa (80° C.). Similar trends were observed for tensile strength of the prints, which increased from 4.1 MPa (20° C.) to 10.6 MPa (80° C.). Based on these results, and without intending to be bound by theory, there the 3D prints can be mechanically tailored by controlling the process parameters of the printing technique.

Examples 8-11

PVDF possesses outstanding piezoelectric properties, which allows it to be utilized as a functional material. Being a semi-crystalline polymer its piezoelectric properties can be enhanced through the promotion of the polar β phase. In these examples, precipitation printing is demonstrated as a scalable and tailorable approach to additively manufacture complex and bulk 3D piezoelectric materials with high β phase PVDF, in particular for incorporation into energy harvesters. The β phase fraction of PVDF is improved to 60% through precipitation printing, yielding more than 200% improvement relative to solvent cast PVDF films. Once the precipitation printed PVDF is hot-pressed to reduce internal porosity, a significant ferroelectric response with a coercive field of 98 MV m$^{-1}$ and a maximum remnant polarization of 3.2 p·C cm$^{-2}$ is observed. Moreover, the piezoelectric d$_{33}$ and d$_{31}$ coefficients of printed then hot-pressed PVDF are measured to be −6.42 pC N$^{-1}$ and 1.95 pC N$^{-1}$, respectively. For energy harvesting applications, a stretching d$_{31}$ mode energy harvester is demonstrated to produce a power density up to 717 p·W cm$^{-3}$, while a printed full-scale heel insole with embedded d$_{33}$ mode energy harvesting is capable of successfully storing 32.2 p·J into a capacitor when used for 3 minutes. Accordingly, the precipitation printing process provides a method for producing high β phase PVDF and bulk piezoelectric energy harvesters with the advantages of achieving geometry complexity, fabrication simplicity, and low cost.

In these examples, a robotic gantry system is used to dispense a polymer solution into a non-solvent reservoir to create 3D structures (FIG. 1). Printing is performed at room temperature (e.g., about 20-30° C. or about 25° C.), thus avoiding diminishment of the β phase at high temperature due to its low thermal stability above 160° C. As shown in these examples, the printed structure is no longer limited to a thin film geometry, as a layer by layer deposition process can implemented to fabricate larger 3-dimensional devices. In addition, the immersion precipitation of PVDF in water produces asymmetric membranes with high β/α phase ratio at the surface layer, especially when the precipitation temperature is as low as room temperature. Therefore, by using water as the non-solvent medium, precipitation printing at room temperature enables the additive manufacturing of high β phase PVDF structures with geometric and scaling freedom. A stretching mode energy harvester (d$_{31}$ mode) and a wearable full-scale heel insole energy harvester (d$_{33}$ mode) were fabricated to illustrate bulk piezoelectric devices that can be formed using the disclosed methods.

Methods and Materials

Solutions for precipitation 3D printing were prepared by dissolving 15 wt % (PVDF) powder (KYNAR 301F) in N,N-dimethylformamide (DMF) (ACS certified, Fisher Chemical) solvent or at 15 wt % PVDF in dimethyl sulfoxide (DMSO) (ACS certified, Fisher Chemical). These clear PVDF solutions were prepared by centrifugal shear mixing and ultra-sonication.

The 3D printing setup used here in these examples is illustrated in FIG. 1. The PVDF solution was loaded into a 10 mL syringe with a 26-gauge (254 μm inner diameter) stainless-steel dispensing needle which was pneumatically controlled by a high precision dispenser, and installed on a Cartesian gantry system (AGS1500, AEROTECH) for vertical and translational movements. A glass plate with a thin doctor-blade cast PVDF film adhered on the top surface was immersed in a water reservoir in order to act as the printing substrate with improved adhesion between the printed structure and the substrate. During the 3D printing process, the pressure, layer height, printing speed and extrusion spacing were set to be 2.5 psi (17.2 kPa), 50 μm, 7 mm s$^{-1}$ and 150 μm, respectively. Both parallel (all 0°) and alternating (0° and 90° alternating layer by layer) printing infill directions were performed. After the printing process was completed, the PVDF samples were left in the water for 1 hour to allow for complete DMF diffusion into the water, then the samples were removed from the water reservoir and dried under vacuum overnight. The printed PVDF samples had highly porous microstructures with both macroscale pores (about 100 μm pore size) that were formed due to the evaporation of trapped solvent in the polymer, and microscale pores (submicron pore size) that were formed by the rapid diffusion of the solvent during precipitation printing. The printed PVDF samples showed good interlayer bonding that no clear layer boundary (layer height 50 μm) or layer separation was observed.

Fourier-transform infrared spectroscopy (FTIR) was performed on precipitation printed PVDF samples from both DMF solution and DMSO solution using a NICOLET IS50 FTIR spectrometer with a SMART ITR Attenuated Total Reflectance (ATR) accessory, while solvent cast PVDF films from DMF solution were used as references. The effect of different printing infill directions (parallel or alternating) and different post-processes (heat treatment, annealing, hot-pressing and electric poling) on the phase composition of the printed PVDF was also investigated through FTIR spectroscopy. The characteristic absorbance peaks of α phase at 763 cm$^{-1}$, β phase at 1275 cm$^{-1}$, and γ phase at 1234 cm$^{-1}$ were used to qualitatively investigate the existence of each crystalline phase (α, β, γ). The following equations were used to quantitatively determine the fraction of crystallization of (1) combined β and γ phase as electroactive phase (F$_{EA}$), (2) β phase (F(β)), (3) γ phase (F(γ)), and (4) α phase (F(α)):

$$F_{EA} = \frac{I_{840}}{\left(\frac{K_{840}}{K_{763}}\right)I_{763} + I_{840}} \quad (1)$$

$$F(\beta) = \frac{F_{EA} I_\beta^{840}}{\left(\frac{K_\beta^{840}}{K_\gamma^{833}}\right)I_\gamma^{833} + I_\beta^{840}} = \frac{I_{840}}{\left(\frac{K_{840}}{K_{763}}\right)I_{763} - I_{840}} \times \frac{I_\beta^{840}}{\left(\frac{K_\beta^{840}}{K_\gamma^{833}}\right)I_\gamma^{833} + I_\beta^{840}} \quad (2)$$

$$F(\gamma) = F_{EA} - F(\beta) \quad (3)$$

$$F(\alpha) = 1 - F_{EA} \quad (4)$$

In the above equations, I$_{763}$ is the absorbance at 763 cm$^{-1}$, I$_{840}$ is the absorbance at 840 cm$^{-1}$, K$_{840}$/K$_{763}$ is the ratio of absorption coefficients at these respective wavenumbers, which is 1.26. I$^{833}$γ and I$^{840}$β are the absorbances of individual γ and β phases at the corresponding wavenumber after the curve deconvolution of the 830-840 cm$^{-1}$ β peak, while K$^{840}$β/K$^{833}$γ is the ratio of absorption coefficients of γ and β phases at the corresponding wavenumbers, which is 0.88.

X-ray diffraction (XRD) analysis was performed on both precipitation printed PVDF and solvent cast PVDF using a RIGAKU ULTIMA IV X-Ray Diffractometer with CuKα radiation (λ=0.154 nm). The peaks at 17.6°, 18.4° and 19.9° are ascribed as α phase (JCPD No. 42-1650), while the peaks at 18.6° and 20.6° represent β phase (JCPD No. 42-1649). The γ phase has peaks at 18.6° and 20.3° (JCPD No. 38-1638), which overlap with the β phase peaks due to their similar short-term conformation.

Differential scanning calorimetry (DSC) was performed on both precipitation printed PVDF and solvent cast PVDF using a differential scanning calorimeter (Q2000, TA Instruments) to verify the total degree of crystallinity estimation from the XRD analysis. A temperature ramp from 30° C. to 200° C. at 5° C. min$^{-1}$ rate was applied to the samples.

To determine relative permittivity, PVDF samples were printed, sputtered with gold electrodes, and then cut into squares for size, thickness and capacitance measurements using caliper, micrometer and precision LCR meter (E4980A, Keysight Technologies), respectively. The capacitance was measured under a frequency sweep, from 100 Hz to 1 MHz. The relative permittivity was then calculated using the capacitance equation of a parallel plate capacitor.

The ferroelectric property of the PVDF samples was determined by measuring the ferroelectric hysteresis loop through a Sawyer-Tower circuit. The precipitation printed PVDF samples were first hot-pressed at 80° C. to remove the majority of internal voids. The samples were then immersed in an oil bath to avoid breakdown under the high external electric field. A function generator (33210A, Keysight Technologies) was used to provide a 1 Hz sinusoidal voltage signal and was amplified using a voltage amplifier (Model 10/10B, TREK).

Electric poling was applied to PVDF samples prior to piezoelectric testing. Although corona poling can be used for large films when trying to avoid sample shorting, precipitation printed PVDF samples have rough surfaces and porosity which make them vulnerable to corona current and small breakdown spots. Thus, direct field poling was selected to be the poling method for precipitation printed PVDF. In order to increase the breakdown strength of the samples, printed PVDF samples were first soaked in an 80° C. oil bath for 1 hour to remove the air trapped inside their pores. A high voltage (2-15 kV) was then applied across the thickness of the PVDF samples (100-200 μm) using two flat aluminum electrodes, forming a strong electric field of 20-75 MV m$^{-1}$ that remains below the breakdown strength of bulk PVDF (250-300 MV m$^{-1}$). Electric fields higher than 75 MV m$^{-1}$ were not applied due to the breakdown of the oil within the sample that would cause shorting. The PVDF samples were poled in 80° C. oil for 2 hours and slowly cooled down to room temperature under the selected applied electric field. The poled samples were then washed with methanol to remove residual oil and dried under vacuum overnight. Once fully dry, the samples were sputtered coated with thin gold electrodes on both sides for piezoelectric testing.

The piezoelectric coefficients of precipitation printed PVDF were measured through direct piezoelectric effect. The piezoelectric $d_{33}$ coefficient was obtained using a customized compression test frame with a Berlincourt circuit that measures the voltage output of 5 mm×5 mm×0.2 mm samples under a 10 Hz sinusoidal compressive force excitation generating 0.5% strain. The shape of the testing probes influences $d_{33}$ measurements, so both semi-domed and flat probes were used for the $d_{33}$ measurements of printed PVDF samples. The piezoelectric $d_{31}$ coefficient was obtained by using a dynamic mechanical analysis (DMA) system (Q800, TA Instruments) to apply a 10 Hz uniaxial 0.5% sinusoidal strain to precipitation printed and electric field poled PVDF samples (25 mm×5 mm×0.1 mm) with gold electrodes sputtered on both sides.

Example 8—PVDF Phase Properties

FTIR spectra of precipitation printed PVDF from DMF and DMSO solutions were compared with that of DMF solvent cast PVDF films. Unlike the solvent cast PVDF films which have a strong α phase absorption peak around 763 cm$^{-1}$, precipitation printed PVDF samples from both DMF and DMSO solutions showed an evident β phase peak at 1275 cm$^{-1}$, but no clear 763 cm$^{-1}$ α phase peak. A small shoulder around 1234 cm$^{-1}$ indicated the existence of γ phase in both solvent cast and precipitation printed PVDF samples. Quantitative crystalline phase fraction results showed that the β phase fraction was increased from less than 20% in solvent cast films to around 60% in precipitation printed ones, while the γ phase fraction remained constant at around 30%. The fraction of total electroactive phases (β+γ) in precipitation printed PVDF was therefore promoted to 90%, resulting in more than 100% increase relative to solvent cast films and indicating a more polar conformation that allows for better piezoelectric properties. The printing infill direction was shown to have no significant influence on the phase composition of the printed PVDF using either DMF or DMSO solution, yet samples printed from DMF solution showed slightly higher β phase fraction than those printed from DMSO solution.

Without wishing to be bound by a particular theory, it is believed that high β phase PVDF results at least in part by the interaction between PVDF and water, where the hydroxyl group (O—H) of the water molecules can form hydrogen bonds with the fluorine atoms of the PVDF molecules to promote all-trans chain conformation (TTT). During the immersion precipitation process of cast PVDF solution, the surface of the solution has rapid mass exchange between the solvent and non-solvent, which increases the polymer concentration at the interfacial region, and preferably leads to better oriented $CH_2$—$CF_2$ packing (e.g. all-trans) due to conformation entropy. During the precipitation printing process, the PVDF solution is dispensed into the water environment, which continuously creates a local interfacial region around the dispensing needle. Due to the layer-by-layer 3D printing characteristics, this interfacial region becomes dominant throughout a printed sample, and thus promotes the formation of strong polar β phase and weaker polar γ phase PVDF.

Although the precipitation printing process was performed at room temperature, the electric poling process employed elevated temperatures to accelerate the dipole alignment which necessitates to the investigation of the stability of each crystalline phase at elevated temperatures. Both PVDF samples printed from DMF and DMSO solutions had a stable β phase (more than 60%) up to 130° C., but had a phase transformation from β phase to α phase at 180° C., which was above the melting point of PVDF at around 178° C. DMF was chosen to be the standard solvent for precipitation printing of PVDF for subsequent samples due to its better promotion of β phase formation over DMSO, while providing the same thermal stability of printed β phase PVDF. In addition, unlike DMSO, DMF does not cause PVDF coagulation issues if stored in a vial for more than two days.

Effects of other postprocesses on the phase composition of printed PVDF were further evaluated from FTIR spectra (not shown) of 80° C. annealed, 80° C. hot-pressed (around 20 MPa), and electric field poled (soaked in 80° C. oil bath with 75 MV m$^{-1}$ field strength) PVDF after precipitation printing. According to the phase fraction results, hot-pressing the PVDF by applying a high compressive mechanical load to densify the porous printed samples slightly reduced both β phase and γ phase. In contrast, annealing and electric field poling could further transform γ phase to β phase. Among these postprocesses, soaking the film in an oil bath at 80° C. while applying electric field provided the highest β phase promotion, since the chain mobility at elevated temperature was high enough to enable reorientation of PVDF chains under high electric field to form β phase.

A summary of the phase fraction of the α, β, and γ phases relative to total crystalline content for the various PVDF samples is provided in Table 2 below.

TABLE 2

PVDF Crystalline Phase Fractions

| Samples | F(α) | F(β) | F(γ) |
|---|---|---|---|
| Solvent cast PVDF from DMF solution | 57% | 13% | 30% |
| Printed PVDF from DMF solution (parallel infill) | 9% | 63% | 28% |
| Printed PVDF from DMF solution (alternating infill) | 9% | 65% | 26% |
| Printed PVDF from DMSO solution (parallel infill) | 9% | 61% | 30% |
| Printed PVDF from DMSO solution (alternating infill) | 11% | 59% | 30% |
| Printed PVDF from DMF solution then heated at 80° C. | 10% | 68% | 22% |
| Printed PVDF from DMF solution then heated at 130° C. | 9% | 71% | 20% |
| Printed PVDF from DMF solution then heated at 180° C. | 66% | 23% | 11% |
| Printed PVDF from DMSO solution then heated at 80° C. | 9% | 63% | 28% |
| Printed PVDF from DMSO solution then heated at 130° C. | 12% | 68% | 20% |
| Printed PVDF from DMSO solution then heated at 180° C. | 66% | 23% | 11% |
| Printed PVDF from DMF solution then 80° C. annealed | 10% | 73% | 17% |
| Printed PVDF from DMF solution then 80° C. hot-pressed | 17% | 60% | 23% |
| Printed PVDF from DMF solution then electric field poled | 9% | 78% | 13% |

X-ray diffractograms (not shown) of both solvent cast and precipitation printed PVDF samples were evaluated. The precipitation printed PVDF exhibited a clear β phase peak at 2θ=20.6° with some extent of γ phase contribution that contributes to broadening effect to the main peak. In contrast, the solvent cast PVDF showed all α phase characteristic peaks, along with some γ phase contribution around 2θ=20.3°. The total degree of crystallinity of the precipitation printed PVDF calculated through XRD analysis was 62%, which was 8% higher than solvent cast PVDF ($\chi c$=54%). By using DSC analysis to verify the total degree of crystallinity estimation, precipitation printed PVDF was also shown to possess a higher total degree of crystallinity ($\chi c$=55%) than solvent cast PVDF ($\chi c$=46%), albeit both measurements were lower than those obtained through XRD. The total degree of crystallinity measured by DSC is more accurate since it is ambiguous to distinct between crystalline peaks and amorphous halos during curve deconvolution of XRD pattern. Combining FTIR, XRD and DSC analysis, it can be concluded that precipitation printed PVDF exhibits dominant β phase, some γ phase and negligible α phase, while also having a higher total degree of crystallinity and can outperform conventional solvent cast PVDF films in piezoelectric properties.

Example 9—PVDF Dielectric and Ferroelectric Properties

The relative permittivity of precipitation printed PVDF, was measured from 1 kHz to 1 MHz and compared to that of solvent cast PVDF. The relative permittivity of precipitation printed PVDF was measured to be 3.55 at 1 kHz frequency, which is only 39% of that of solvent cast PVDF film (9.20 relative permittivity at 1 kHz). This low relative permittivity was attributed to the low density of the precipitation printed PVDF (0.646±0.012 g cm$^{-3}$), which has 64% porosity compared with fully dense PVDF. Despite hot-pressing, which reduced the porosity of the printed PVDF to 7% (1.66±0.01 g cm$^{-3}$ density compared to fully dense PVDF which is 1.78 g cm$^{-3}$, the relative permittivity of the hot-pressed PVDF samples was measured to be 5.20 at 1 kHz frequency, which was 57% of the solvent cast film. This result indicated that voids present in printed PVDF are only compressed to smaller volumes by hot-pressing, as the influence of voids on PVDF permittivity could be eliminated completely. However, the lower relative permittivity could translate into a higher piezoelectric voltage coefficient which leads to more efficient sensors and energy harvesters.

The ferroelectric hysteresis loops of both printed then hot-pressed PVDF samples and solvent cast PVDF films were also measured under apparent electric field strengths ranging between 100 MV m$^{-1}$ and 230 MV m$^{-1}$. Due to the relatively low breakdown strength of the oil, a maximum apparent electric field of 210 MV m$^{-1}$ could be applied to the printed then hot-pressed PVDF samples before breakdown, resulting in an unsaturated ferroelectric hysteresis loop. As the applied electric field as increased to above 180 MV m$^{-1}$, a constant coercive field of 123 MV m$^{-1}$ was reached. The maximum remnant polarization of the printed then hot-pressed PVDF samples before breakdown was 3.23 pC cm$^{-2}$, while the solvent cast PVDF films under the same applied electric field showed a remnant polarization of 0.44 pC cm$^{-2}$. The high remnant polarization and strong ferroelectric behavior of the precipitation printed PVDF compared to solvent cast PVDF verified that β phase, which is the ferroelectric crystalline phase, was the dominant phase through precipitation printing. However, the dielectric property indicated that porosity was the main obstacle for higher β phase in precipitation printed PVDF to achieve better ferroelectric and piezoelectric performance.

Example 10—PVDF Piezoelectric Properties

Table 3 below summarizes the results of the Berlincourt measurements to determine the $d_{33}$ and $d_{31}$ piezoelectric properties of the PVDF materials.

TABLE 3

PVDF Piezoelectric Properties

| | Processing Method | | |
|---|---|---|---|
| Coefficient | Printed (20 MV m$^{-1}$ poling field) | Printed (75 MV m$^{-1}$ poling field) | Printed then hot pressed (75 MV m$^{-1}$ poling field) |
| $d_{33}$ (pC N$^{-1}$) | −0.12 +/− 0.01 | −0.99 +/− 0.10 | −6.42 +/− 0.78 |
| $d_{31}$ (pC N$^{-1}$) | 0.30 +/− 0.04 | 1.08 +/− 0.04 | 1.95 +/− 0.21 |

The $d_{33}$ coefficient using a flat probe is significantly improved from −0.12±0.01 pC N$^{-1}$ to −0.99±0.10 pC N$^{-1}$ when increasing the poling electric field from 20 MV m$^{-1}$ to 75 MV m$^{-1}$. From these d$_{33}$ measurement results, the poling field strength was shown to be a useful parameter for maximizing piezoelectric response, with 75 MV m$^{-1}$ being the suitable field strength for poling when trying to avoid electric shorting in the printed samples. Nonetheless, the average d$_{33}$ coefficient of printed and 75 MV m$^{-1}$ poled samples remained relatively low compared to that of fully dense PVDF sheets, since the precipitation printed PVDF only has a density of 0.646 g cm$^{-3}$ (64% porosity). The d$_{33}$ coefficient of printed then hot-pressed PVDF after 75 MV m$^{-1}$ electric field poling was improved up to −6.42±0.78 pC N$^{-1}$, a 550% increase relative to directly printed PVDF and poled under same conditions. Although printed PVDF recovered 93% of its density following hot-pressing, the remaining porosity reduced the dielectric and piezoelectric behaviors, which explained the lower d$_{33}$ coefficient measurements when compared to uniaxial or bi-axial PVDF films that possess d$_{33}$ coefficient of about −20 to −24 pC N$^{-1}$.

The d$_{31}$ coefficients also demonstrate a significant improvement in piezoelectric response when increasing the electric field during poling from 20 MV m$^{-1}$ to 75 MV m$^{-1}$. The measured d$_{31}$ coefficient for a sample poled under 75 MV m$^{-1}$ electric field is 1.08±0.04 pC N$^{-1}$, a 260% increase relative to samples poled under 20 MV m$^{-1}$ electric field (0.30±0.04 pC N$^{-1}$). Similar to d$_{33}$, the d$_{31}$ coefficient can be further improved through hot-pressing, as the reduced porosity yields an approximately 100% improvement in d$_{31}$ (1.95±0.21 pC N$^{-1}$). The increase in d$_{31}$ coefficient due to hot-pressing is not as significant as that in d$_{33}$ coefficient, however, possibly indicating that the piezoelectric effect in tension is more sensitive to the porosity than in compression, due to pore expansion.

Example 11—PVDF Energy Harvester

A stretching mode energy harvester is a device that transforms waste mechanical energy from axial displacement into usable electrical energy and are often used in environments that have a significant amount of ambient vibration. A precipitation printed 25 mm×5 mm×0.1 mm rectangular bar stretching mode energy harvester (FIG. 16A) was poled with 75 MV m$^{-1}$ electric field and then excited by 0.5% uniaxial tensile strain at varying frequencies. The power density of the energy harvester was obtained by loading the sample with a variable resistor ranging between 0-40 MO and measuring the root mean square (RMS) voltage over the load resistance.

Root mean square (RMS) voltage, power, and power density were collected using a dynamic mechanical analyzer (DMA) as the excitation source for the precipitation d$_{31}$ stretching mode energy harvester of FIG. 16A. As the excitation frequency increased, both the output voltage and power increased. The equivalent internal resistance of the sample decreased as the excitation frequency increased, resulting in the maximum output power occurring at a lower load resistance for higher excitation frequencies. The maximum output power and power density of the stretching mode energy harvester under 100 Hz excitation (the highest excitation frequency that can be applied to the sample without breaking) at 0.5% strain were 202 nW and 44 μW cm$^{-3}$, respectively. To further improve the energy harvesting performance, printed then hot-pressed PVDF was also used as a stretching mode energy harvester. The maximum output power and power density of the stretching mode energy harvester were 7.96 μW and 717 μW cm$^{-3}$, respectively, under 100 Hz excitation at 0.5% strain. Therefore, the hot-pressed stretching mode energy harvester displays a power density that is 16 times higher than that of the directly printed one, highlighting the importance of reducing internal porosity of precipitation printed PVDF through hot-pressing in order to maximize energy harvesting performance.

Figure 16C:
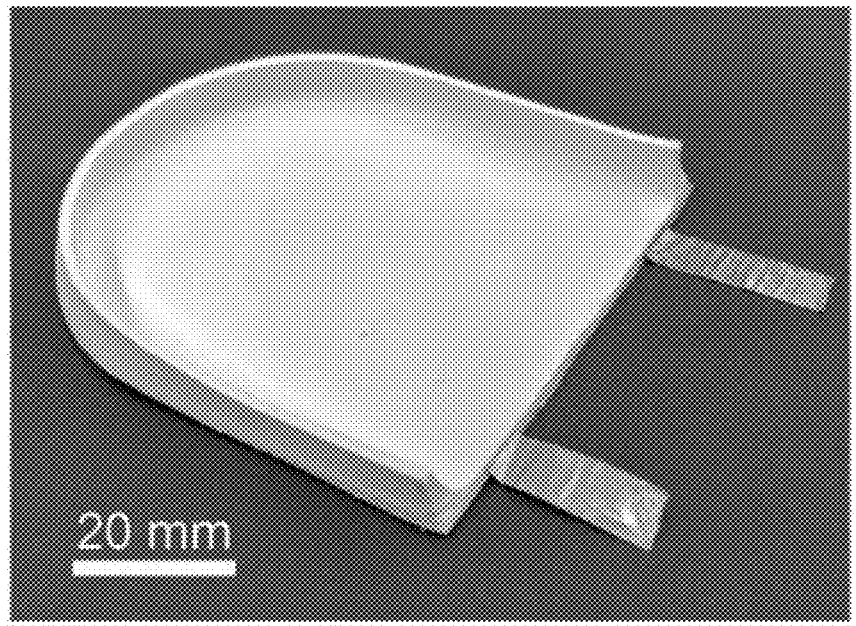
FIG. 16C is an image of a longitudinal mode energy harvester apparatus according to the disclosure and in the form of a heel insole.

A full-scale heel spur insole with dimensions of 70 mm×60 mm×6 mm was also designed and manufactured using precipitation printed PVDF. The insole consists of three layers: a top layer with curved edges to fit heels, a 0.25 mm thick middle layer acting as the piezoelectric energy harvester and a bottom layer providing structural support (FIG. 16B). In order to obtain a high piezoelectric response, the middle layer of PVDF was first precipitation printed and then hot-pressed to remove the majority of the voids. The hot-pressed layer was then electrically poled in oil under 75 MV m$^{-1}$ electric field. Once poled, the middle layer was sputtered with gold electrodes to which copper tapes were attached in order to measure the voltage output. All three layers were assembled by solvent welding using a PVDF solution and dried for an hour to obtain the final device (FIG. 16C). The heel insole was then tested through both compression testing in a load frame (E1000, Instron) and human walking steps. Finally, the ability of charging a capacitor with this heel insole energy harvester through rectifiers was also measured.

Figure 17:
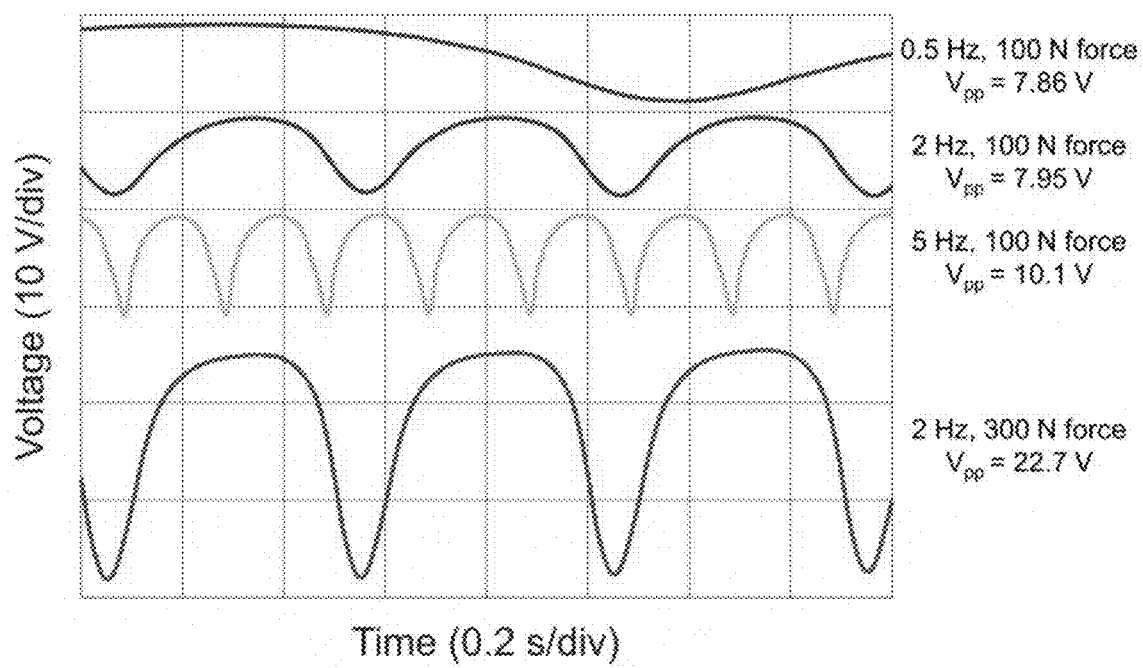
FIG. 17 is a graph of the open circuit voltage response of the heel insole energy harvester under different compression force amplitudes and frequencies.

The 3D printed heel insole energy harvester of FIGS. 16B and 16C was fabricated to demonstrate the ability of a bulk piezoelectric device to collect waste mechanical energy in d$_{33}$ mode (longitudinal piezoelectric effect). The main structure of the heel insole energy harvester was directly precipitation 3D printed, which has a size for an average adult male and a wearable shape designed for heel support, and the embedded piezoelectric layer was also hot-pressed to enhance energy harvesting performance. It was first tested under different compression force amplitudes and frequencies to verify the piezoelectric performance of large-scale printed then hot-pressed PVDF. As illustrated in FIG. 17, the open circuit voltage response agrees with the measured d$_{33}$ value above. The open circuit voltage increases slightly as the excitation frequency increases. The 2 Hz, 300 N amplitude excitation is used to simulate the force that an adult could apply on the heel insole, and it indicates that the heel insole energy harvester would be saturates in this real case situation. The output RMS voltage, power, and power density of the heel insole energy harvester were also measured. To simulate the frequency of actual human steps and in view of testing instrument limitations, low frequencies (0.5 Hz, 2 Hz and 5 Hz) and a 100 N amplitude force were used for testing. The maximum power and power density occurred under the highest frequency of 5 Hz, which were 345 nW and 1.2 μW cm$^{-3}$, respectively. The output power and power density would be higher if excited using a force amplitude of 300 N and at a similar frequency. Compared with other thin film piezoelectric shoe insole energy harvesters in the art, precipitation printed full heel insole generates a comparable high voltage output (about 20-30 V) but lower power output, due to a much larger internal impedance caused by a larger thickness of the heel insole.

The energy harvesting performance of the heel insole under human walking was also evaluated. For 5 steps obtained using full wave rectifiers, the peak voltage ranged from 17 V to 26 V due to natural variation in tread strengths. The heel insole energy harvester was then used to charge a 4.7 μF capacitor through a full wave rectifier. After continuously stepping on the heel insole for 60 steps, the capacitor was charged to 1.7 V, equivalent to 8.0 pC in electric charge or 6.8 μJ of energy. When stepping on the heel insole for about 3 minutes, the capacitor could be charged up to 3.7 V, thus storing 17.4 pC in electric charge or 32.2 µJ of energy. After charging of the capacitor stopped, the self-discharging rate of the energy harvesting system was about 1 pC min$^{-1}$, which ensures the energy storage efficiency. This highlights the piezoelectric energy harvesting performance of the printed heel insole as means to collect waste mechanical energy during daily walking and transform it into usable and storable electrical energy. Therefore, precipitation printing provides a practical approach for fabricating bulk piezoelectric energy harvesters that exploit the $d_{33}$ mode effect, which is typically difficult to achieve using thin films. In addition, simplicity and low cost of the fabrication processes are two other main advantages of the proposed heel insole energy harvester since it requires only four fabrication steps: PVDF precipitation printing, hot-pressing, electric poling, and assembly, compared with other devices using $d_{31}$ mode effect that usually requires the fabrication and assembly of additional fixtures and substrates made of different materials.

What is claimed is:

1. A method of forming a three-dimensional (3D) polymeric article, the method comprising:
providing a polymeric solution comprising a polymer dissolved in a solvent, wherein the polymer comprises poly(vinylidene fluoride) (PVDF);
providing a non-solvent, wherein the solvent is miscible in the non-solvent, and the polymer is insoluble in the non-solvent;
injecting the polymeric solution into the non-solvent in a pre-determined 3D pattern, thereby precipitating the polymer from the polymeric solution in the non-solvent as a solid polymeric material to provide the 3D polymeric article in the form of a piezoelectric material; and
performing at least one of annealing, hot-pressing, and poling to the 3D polymeric article after precipitation;
wherein the PVDF in the 3D polymeric article after performing the at least one of annealing, hot-pressing, and poling has a combined beta ($\beta$) and gamma ($\gamma$) phase content of at least 80%.

2. The method of claim 1, wherein the polymeric solution further comprises a reinforcement or filler selected from the group consisting of multi-walled carbon nanotubes (MWCNT), single-walled carbon nanotubes (SWCNT), metal powder, aramid nanofibers, nanowires, or a combination thereof.

3. The method of claim 2, wherein the metal powder comprises gold, silver, copper, or a combination thereof.

4. The method of claim 2, wherein the polymeric solution comprises a MWCNT present in an amount of 0.005 wt. % to about 8 wt. %, based on the total weight of the polymeric solution.

5. The method of claim 1, wherein the solvent comprises N,N-dimethylformamide (DMF), acetone, dichloromethane (DCM), toluene, dimethylsulfoxide (DMSO), N,N-dimethylacetamide (DMAc), methyl ethyl ketone (MEK), benzene, styrene, xylene, N-methyl-2-pyrrolidone (NMP), propylene carbonate, tetrahydrofuran (THF), or a combination thereof.

6. The method of claim 1, wherein the polymer is present in a concentration of at least about 10 wt. %, based on the total weight of the polymeric solution.

7. The method of claim 1, wherein the polymeric solution further comprises an additive.

8. The method of claim 7, wherein the additive comprises an emulsifier, a surfactant, a dispersant, a colorant, or any combination thereof.

9. The method of claim 7, wherein the polymeric solution comprises polyvinylpyrrolidone in an amount of about 0.5 wt. % to about 2 wt. %, based on the total weight of the polymeric solution.

10. The method of claim 1, wherein the non-solvent comprises water, ethanol, benzene, silicone oil, or a combination thereof.

11. A method of forming a three-dimensional (3D) polymeric article using an additive manufacturing apparatus, the method comprising:
providing a polymeric solution comprising a polymer dissolved in a solvent, wherein the polymer comprises poly(vinylidene fluoride) (PVDF);
providing a non-solvent, wherein the solvent is miscible in the non-solvent, and the polymer is insoluble in the non-solvent;
injecting the polymeric solution into the non-solvent in a pre-determined 3D pattern, thereby precipitating the polymer from the polymeric solution in the non-solvent as a solid polymeric material to provide the 3D polymeric article in the form of a piezoelectric material; and
performing at least one of annealing, hot-pressing, and poling to the 3D polymeric article after precipitation;
wherein the additive manufacturing apparatus comprises:
a reservoir comprising the non-solvent;
a printing substrate immersed in the non-solvent;
an injection head adapted to deliver the polymeric solution into the non-solvent in the reservoir; and,
one or more temperature control means adjacent to or incorporated into the reservoir, wherein (i) each temperature control means is independently selected from the group consisting of a heating jacket, a heating surface, a cooling jacket, and a cooling surface, and (ii) the one or more temperature control means is adapted to control the temperature of the non-solvent in the reservoir.

12. The method of claim 11, wherein the printing substrate is a glass plate.

13. The method of claim 11, wherein the printing substrate comprises a film coating, the film coating comprising the polymer of the polymeric solution.

14. The method of claim 11, wherein the injection head comprises a dispensing needle having a diameter of about 24-gauge (305 µm) to about 30-gauge (150 µm).

15. The method of claim 11, wherein injecting the polymeric solution into the non-solvent comprises:
contacting the injection head and the printing substrate to apply a first layer of the polymer to the printing substrate; and,
applying a plurality of layers of the polymer, each layer being applied to a previous layer, until the 3D polymeric article is formed.

16. The method of claim 15, wherein each layer of the plurality of layers is applied at a continuous printing speed of about 5 mm/s to about 12 mm/s.

17. The method of claim 15, wherein each layer of the plurality of layers has a thickness of about 0.03 mm to about 1 mm.

18. The method of claim 15, wherein each layer of the plurality of layers is applied at a pressure of about 1.0 psi (6.9 kPa) to about 30.0 psi (207 kPa).

19. The method of claim 1, wherein the non-solvent has a temperature of about 20° C. to about 80° C.

20. The method of claim 1, wherein the non-solvent comprises up to about 8 wt. % of a salt, based on the total weight of the non-solvent.

21. The method of claim 20, wherein the salt comprises sodium chloride.

22. The method of claim 1, wherein the method is free of solvent evaporation.

23. The method of claim 1, wherein directly printed polymeric material forming the 3D polymeric article has a density that is at least 20% of the polymer density.

24. The method of claim 1, wherein:
the 3D polymeric article is in the form of a piezoelectric flexible conductor nanocomposite;
the nanocomposite comprises the PVDF as a solid polymeric matrix; and
the polymeric solution comprises a reinforcement initially dispersed in the solvent and distributed throughout the solid polymeric matrix in the nanocomposite.

25. The method of claim 1, wherein the PVDF in the 3D polymeric article after performing the at least one of annealing, hot-pressing, and poling has a beta (β) phase content of at least 40%.

26. The method of claim 1, wherein the PVDF in the 3D polymeric article after performing the at least one of annealing, hot-pressing, and poling has:
a combined beta (β) and gamma (γ) phase content of at least 85%;
a beta (β) phase content in a range of 60% to 90%; and
a gamma (γ) phase content in a range of 10% to 40%.

27. The method of claim 1, further comprising:
incorporating the 3D polymeric article into a piezoelectric energy harvester comprising at least two electrodes in contact with the 3D polymeric article and in electrical connection with an electrical load for storing or using electrical energy generated from a compressive displacement of the 3D polymeric article.

28. The method of claim 1, comprising injecting the polymeric solution into the non-solvent at an injection temperature of 15° C. or less or at least 30° C. in the pre-determined 3D pattern, wherein the injection temperature is the temperature of at least one of the polymeric solution and the non-solvent during injecting.

29. The method of claim 1, comprising injecting the polymeric solution into the non-solvent in the pre-determined 3D pattern at two or more different printing infill orientations relative to a reference plane defined by a printing substrate in the non-solvent.

* * * * *